United States Patent
Xu

(10) Patent No.: US 10,796,442 B2
(45) Date of Patent: Oct. 6, 2020

(54) TWO-DIMENSIONAL IMAGE DEPTH OF FIELD GENERATION METHOD AND DEVICE

(71) Applicant: SHENZHEN SKYWORTH-RGB ELECTRONIC CO., LTD., Shenzhen, Guangdong (CN)

(72) Inventor: Yaoling Xu, Guangdong (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 125 days.

(21) Appl. No.: 16/094,232

(22) PCT Filed: Sep. 5, 2016

(86) PCT No.: PCT/CN2016/098066
§ 371 (c)(1),
(2) Date: Oct. 17, 2018

(87) PCT Pub. No.: WO2017/181575
PCT Pub. Date: Oct. 26, 2017

(65) Prior Publication Data
US 2019/0096074 A1 Mar. 28, 2019

(30) Foreign Application Priority Data
Apr. 19, 2016 (CN) .......................... 2016 1 0244073

(51) Int. Cl.
*G06T 7/529* (2017.01)
*G06T 7/00* (2017.01)
(Continued)

(52) U.S. Cl.
CPC .............. *G06T 7/529* (2017.01); *G06K 9/628* (2013.01); *G06T 7/00* (2013.01); *G06T 7/40* (2013.01);
(Continued)

(58) Field of Classification Search
CPC ............ G06T 7/529; G06T 7/00; G06N 9/628
See application file for complete search history.

(56) References Cited

U.S. PATENT DOCUMENTS 6,584,219 B1 * 6/2003 Yamashita .............. G06T 15/10
382/154
8,933,928 B2 1/2015 Shiell et al.
(Continued)

FOREIGN PATENT DOCUMENTS

| CN | 101841727 | 9/2010 |
|---|---|---|
| CN | 102509294 | 6/2012 |

(Continued)

OTHER PUBLICATIONS

International search report dated Jan. 3, 2017 from corresponding application No. PCT/CN2016/098066.
(Continued)

*Primary Examiner* — Zhitong Chen
(74) *Attorney, Agent, or Firm* — Hauptman Ham, LLP

(57) ABSTRACT

Disclosed are a two-dimensional image depth of field generation method and device, the method including: obtaining a target image, classifying the target image to obtain corresponding multiple image classes, and calculating the maximum sharpness value corresponding to each image class; respectively acquiring an object of each image class to estimate sharpness value of the object of each image class, and classifying the object of each image class based on the maximum sharpness values corresponding to each image class; estimating depth value of the object of each image class using a depth value estimation algorithm, based on the sharpness value of the classified object of each image class; and estimating depth of field value of the object of each
(Continued)

image class using a depth of field value estimation algorithm, based on the depth value of the object of each image class.

12 Claims, 6 Drawing Sheets

(51) Int. Cl.
 *G06K 9/62* (2006.01)
 *G06T 7/40* (2017.01)
 *H04N 13/261* (2018.01)
(52) U.S. Cl.
 CPC . *H04N 13/261* (2018.05); *G06T 2207/10004* (2013.01); *G06T 2207/20021* (2013.01)

(56) References Cited

U.S. PATENT DOCUMENTS

| 9,165,367 | B2 | 10/2015 | Kim et al. | |
| 2008/0303894 | A1* | 12/2008 | Ernst | H04N 13/261 |
| | | | | 348/43 |
| 2012/0056887 | A1 | 3/2012 | Kim et al. | |
| 2013/0027827 | A1 | 1/2013 | Ge et al. | |
| 2013/0215107 | A1* | 8/2013 | Kimura | G06T 15/00 |
| | | | | 345/419 |
| 2014/0294287 | A1* | 10/2014 | Guo | G06K 9/00362 |
| | | | | 382/154 |

FOREIGN PATENT DOCUMENTS

| CN | 102903098 | 1/2013 |
| CN | 103955942 | 7/2014 |
| CN | 104052984 | 9/2014 |

OTHER PUBLICATIONS

Office Action dated Apr. 2, 2018 from corresponding application No. CN 201610244073.4.

* cited by examiner

TWO-DIMENSIONAL IMAGE DEPTH OF FIELD GENERATION METHOD AND DEVICE

RELATED APPLICATIONS

The present application is a National Phase of International Application Number PCT/CN2016/098066, filed Sep. 5, 2016, and claims the priority of China Application No. 201610244073.4, filed Apr. 19, 2016.

FIELD

The present disclosure relates to the field of three-dimensional (3D) display, and more particularly relates to a two-dimensional image depth of field generation method and a two-dimensional image depth of field generation device.

BACKGROUND

With the development of display technology, 3D display technology has been increasingly applied to kinds of 3D display devices. For naked-eye 3D televisions, there is no need for users to wear external apparatus such as 3D eye glasses to experience the 3D display of the televisions.

For television to achieve a naked-eye 3D display, users are required to experience the 3D display of the eye-naked 3D television from different angles, and the eye-naked 3D television needs to present images of multiple viewpoints, among which there are slight differences. However, contents of the multiple viewpoints are very little, generally the naked-eye 3D display is realized by converting contents of two viewpoints or contents of a viewpoint plus depth of field into the contents of multiple viewpoints, or by converting contents of single viewpoint (or two-dimensional) into the contents of multiple viewpoints. But, the mode of two viewpoints plus depth of field or the mode of viewpoint plus depth of field is costly and complicated. Currently, there are a huge amount of single viewpoint contents, such that it is much more feasible to achieve the naked-eye 3D display by converting the single viewpoint contents into the multiple viewpoints contents.

The way of converting single viewpoint to multiple viewpoints is now mainly by first acquiring single viewpoint image depth of field, and then rendering out multiple viewpoints to display. In the prior art, the way of obtaining single viewpoint depth of field mainly includes: image shifting, and continuous image prediction, and so on. However, in some cases, the methods exist the problems such as image cracking, misalignment, distortion jitter, and so on, which would affect the display effect of naked-eye 3D.

SUMMARY

It is one main object of the present disclosure to provide a two-dimensional image depth of field generation method and a two-dimensional image depth of field generation device, aiming to generate depth of field from two-dimensional image, so as to reduce image distortion and improve image stability, thereby satisfying the demands of users.

To achieve the above object, the present disclosure provides a two-dimensional image depth of field generation method, which includes:

obtaining a target image, classifying the target image to obtain corresponding multiple image classes, and calculating the maximum sharpness value corresponding to each image class;

respectively acquiring an object of each image class to estimate sharpness value of the object of each image class, and classifying the object of each image class based on the maximum sharpness values corresponding to each image class;

estimating depth value of the object of each image class using a depth value estimation algorithm, based on the sharpness value of the classified object of each image class; and estimating depth of field value of the object of each image class using a depth of field value estimation algorithm, based on the depth value of the object of each image class.

In some embodiment, the operation of classifying the target image to obtain corresponding multiple image classes, and calculating the maximum sharpness value corresponding to each image class, comprises:

classifying the target image into a foreground image class, a medium image class, and a background image class based on a positional relationship and a morphological relationship between items in the target image; and respectively estimating the maximum sharpness value $Q_f$, $Q_m$ and $Q_b$ corresponding to the foreground image class, the medium image class, and the background image class, based on gray scale information of the foreground image class, the medium image class, and the background image class.

In some embodiment, the operation of respectively acquiring an object of each image class to estimate sharpness value of the object of each image class, and classifying the object of each image class based on the maximum sharpness values corresponding to each image class, comprises:

respectively detecting boundaries and outlines of the items in the foreground image class, the medium image class, and the background image class, to obtain the objects corresponding to the foreground image class, the medium image class, and the background image class;

respectively estimating the sharpness value of each object corresponding to the foreground image class, the medium image class, and the background image class, based on the objects corresponding to the foreground image class, the medium image class, and the background image class; and classifying the objects corresponding to the foreground image class, the medium image class, and the background image class by comparing the sharpness values.

In some embodiment, the operation of classifying the objects corresponding to the foreground image class, the medium image class, and the background image class by comparing the sharpness values, comprises:

comparing the sharpness value of any one of the objects in the foreground image class with the maximum sharpness value $Q_m$ of the medium image class;

classifying the object into the medium image class, and defining the sharpness value of the object as the maximum sharpness value $Q_m$ of the medium image class, if the sharpness value of any one of the objects in the foreground image class is larger than or equal to the maximum sharpness value $Q_m$ of the medium image class;

comparing the sharpness value of any one of the objects in the medium image class with the maximum sharpness value $Q_b$ of the background image class; and classifying the object into the background image class, if the sharpness value of any one of the objects in the medium image class is less than or equal to the maximum sharpness value Qb of the background image class sharpness Qb.

In some embodiment, the operation of estimating depth value of the object of each image class using a depth value estimation algorithm, based on the sharpness value of the classified object of each image class, comprises:

setting a reference sharpness Qs, establishing a depth conversion function based on the reference sharpness Qs;

setting the reference sharpness Qs as the maximum sharpness Qm of the medium image class, and estimating the depth value of the object of the foreground image class using the depth conversion function;

setting the reference sharpness Qs as the maximum sharpness Qb of the background image class, and estimating the depth value of the object of the medium image class using the depth conversion function; and setting the reference sharpness Qs as the maximum sharpness Qb of the background image class, and estimating the depth value of the object of the background image class using the depth conversion function.

In some embodiment, the operation of estimating depth of field value of the object of each image class using a depth of field value estimation algorithm, based on the depth value of the object of each image class, comprises:

performing linear conversion on the depth value of the object in the medium image class using a linear function Line, to estimate the depth of field value of the object in the medium image class;

performing nonlinear compression conversion on the depth value of the object in the background image class using a curve function Curve, to estimate the depth of field value of the object in the background image class; and performing nonlinear compression conversion on the depth value of the object in the foreground image class using the curve function Curve, and superimposing the maximum values of the depth values of the objects in the medium image class, to estimate the depth of field value of the object in the foreground image class.

In some embodiment, after the operation of estimating depth of field value of the object of each image class using a depth of field value estimation algorithm, based on the depth value of the object of each image class, further comprises:

forming a contrast image based on the depth of field value of the object in each image class, and correcting the depth of field value of the object in each image class according to the contrast image; and storing the corrected depth of field value of the object in each image class, to generate corresponding image depth of field.

In addition, to achieve the above object, this disclosure further provides a two-dimensional image depth of field generation device, including a processor and a non-transitory processor-readable medium storing program code executable by the processor, the program code including:

a classification module, configured to obtain a target image, classify the target image to obtain corresponding multiple image classes, and calculating the maximum sharpness value corresponding to each image class;

a sharpness estimation module, configured to respectively acquire an object of each image class to estimate sharpness value of the object of each image class, and classify the object of each image class based on the maximum sharpness values corresponding to each image class;

a depth value estimation module, configured to estimate depth value of the object of each image class using a depth value estimation algorithm, based on the sharpness value of the classified object of each image class; and a depth of field value estimation module, configured to estimate depth of field value of the object of each image class using a depth of field value estimation algorithm, based on the depth value of the object of each image class.

In some embodiment, the classification module is further configured to classify the target image into a foreground image class, a medium image class, and a background image class based on a positional relationship and a morphological relationship between items in the target image; respectively estimate the maximum sharpness value Qf, Qm and Qb corresponding to the foreground image class, the medium image class, and the background image class, based on gray scale information of the foreground image class, the medium image class, and the background image class.

In some embodiment, the sharpness estimation module is further configured to respectively detect boundaries and outlines of the items in the foreground image class, the medium image class, and the background image class, to obtain the objects corresponding to the foreground image class, the medium image class, and the background image class; respectively estimate the sharpness value of each object corresponding to the foreground image class, the medium image class, and the background image class, based on the objects corresponding to the foreground image class, the medium image class, and the background image class; and classify the objects corresponding to the foreground image class, the medium image class, and the background image class by comparing the sharpness values.

In some embodiment, the sharpness estimation module is further configured to compare the sharpness value of any one of the objects in the foreground image class with the maximum sharpness value Qm of the medium image class; classify the object into the medium image class, and define the sharpness value of the object as the maximum sharpness value Qm of the medium image class, if the sharpness value of any one of the objects in the foreground image class is larger than or equal to the maximum sharpness value Qm of the medium image class; compare the sharpness value of any one of the objects in the medium image class with the maximum sharpness value Qb of the background image class; classify the object into the background image class, if the sharpness value of any one of the objects in the medium image class is less than or equal to the maximum sharpness value Qb of the background image class sharpness Qb.

In some embodiment, the depth value estimation module is further configured to set a reference sharpness Qs, establish a depth conversion function based on the reference sharpness Qs; set the reference sharpness Qs as the maximum sharpness Qm of the medium image class, and estimate the depth value of the object of the foreground image class using the depth conversion function; set the reference sharpness Qs as the maximum sharpness Qb of the background image class, and estimate the depth value of the object of the medium image class using the depth conversion function; set the reference sharpness Qs as the maximum sharpness Qb of the background image class, and estimate the depth value of the object of the background image class using the depth conversion function.

In some embodiment, the depth of field value estimation module is further configured to perform linear conversion on the depth value of the object in the medium image class using a linear function Line, to estimate the depth of field value of the object in the medium image class; perform nonlinear compression conversion on the depth value of the object in the background image class using a curve function Curve, to estimate the depth of field value of the object in the background image class; perform nonlinear compression conversion on the depth value of the object in the foreground image class using the curve function Curve, and superimposing the maximum values of the depth values of the objects in the medium image class, to estimate the depth of field value of the object in the foreground image class.

In some embodiment, the device further comprises:
a correction module, configured to form a contrast image based on the depth of field value of the object in each image class, and correcting the depth of field value of the object in each image class according to the contrast image; and
a generation module, configured to store the corrected depth of field value of the object in each image class, to generate corresponding image depth of field.

In the two-dimensional image depth of field generation method and the two-dimensional image depth of field generation device provided by the present disclosure, it's to obtain a target image, classify the target image to obtain corresponding multiple image classes, and calculate the maximum sharpness value corresponding to each image class; respectively acquire an object of each image class to estimate sharpness value of the object of each image class, and classify the object of each image class based on the maximum sharpness values corresponding to each image class; estimate depth value of the object of each image class using a depth value estimation algorithm, based on the sharpness value of the classified object of each image class; and estimate depth of field value of the object of each image class using a depth of field value estimation algorithm, based on the depth value of the object of each image class, store the depth of field value of the object of each image class after correction, and form image depth of field. This solution solves the problem in the prior art that image distortion occurs when obtaining single viewpoint depth of field, and realizes depth of field generation from a two-dimensional image, so as to reduce image distortion and improve image stability, thereby satisfying the demand of users.

The realizing of the aim, functional characteristics and advantages of the present disclosure are further described in detail with reference to the accompanying drawings and the embodiments.

DETAILED DESCRIPTION OF THE EMBODIMENTS

It will be appreciated that the specific embodiments described herein are merely illustrative of the present disclosure and are not intended to limit the present disclosure.

The main technical solution of an embodiment according to the present disclosure is: obtaining a target image, classifying the target image to obtain corresponding multiple image classes, and calculating the maximum sharpness value corresponding to each image class; respectively acquiring an object of each image class to estimate sharpness value of the object of each image class, and classifying the object of each image class based on the maximum sharpness values corresponding to each image class; estimating depth value of the object of each image class using a depth value estimation algorithm, based on the sharpness value of the classified object of each image class; and estimating depth of field value of the object of each image class using a depth of field value estimation algorithm, based on the depth value of the object of each image class, storing the depth of field value after correction, and forming image depth of field.

Thereby, the above technical solution solves the problem in the prior art that image distortion occurs when obtaining single viewpoint depth of field, and realizes depth of field generation from a two-dimensional image, so as to reduce image distortion and improve image stability, thereby satisfying the demand of users.

Figure 1:
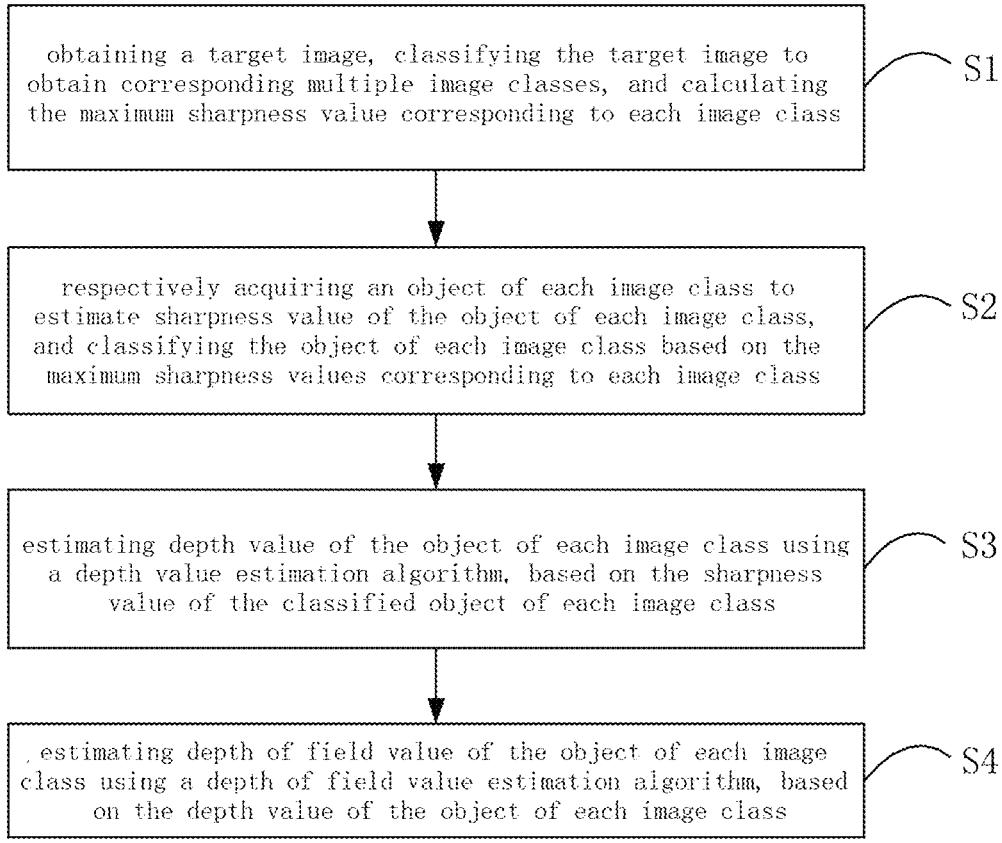
FIG. 1 is an illustrative flowchart of a first embodiment of a two-dimensional image depth of field generation method according to this disclosure.

As illustrated in FIG. 1, a first embodiment according to the present disclosure provides a two-dimensional image depth of field generation method includes:

S1, obtaining a target image, classifying the target image to obtain corresponding multiple image classes, and calculating the maximum sharpness value corresponding to each image class.

An executive body of the method according to the present disclosure may be a 3D television. Although the executive body in this embodiment is exemplified by the 3D television, it is of course not limited to other devices which are capable of realizing 3D image display.

Specifically, the 3D television obtains a target image, classifies the target image to obtain corresponding multiple image classes, and calculates the maximum sharpness value corresponding to each image class.

Wherein, the 3D television according to a positional relationship and a morphological relationship between items in the target image, classifies the target image into the foreground image class, the medium image class and the background image class.

Wherein, the above target image may be a two-dimensional image. The 3D television according to a positional and relatively directional relationship of items in the two-dimensional image, such as distance, adjacency and overlap, combined with shapes, gestures and shadow hints of items and so on, classifies the items into the foreground image class, the medium image class and the background image class.

Wherein, after the operation of classifying the target image into a foreground image class, a medium image class, and a background image class based on a positional relationship and a morphological relationship between items in the target image, the 3D television respectively estimates the maximum sharpness value Qf, Qm and Qb corresponding to the foreground image class, the medium image class and the background image class, based on gray scale information of the foreground image class, the medium image class, and the background image class.

Wherein, the 3D television first converts the foreground image class, the medium image class and the background image class into the HSI format (H is chrominance information, S is color saturation information, and I is gray scale information); then processes the gray scale information I of the foreground image class, the medium image class and the background image class, to obtain alternating component I' of the gray scale information I, and according to the maximum frequency in the spectral characteristic of I', estimates the maximum sharpness values of the foreground image, the medium image, and the background image, respectively as Qf, Qm and Qb.

Wherein, in the specific implementation, the maximum sharpness estimation of the foreground image class is taken as an example:

1, each pixel of the foreground image is expressed by RGB, as $\{R(s, t), G(s, t), B(s, t)\}$, wherein, s and t respectively represent a row coordinate and a column coordinate; by converting the RGB to the HSI format, pixel gray scale information is expressed as: $I(s,t)=[R(s,t)+G(s,t)+B(s,t)]/3$;

2, an average gray scale value of the foreground image is expressed as:

$$\bar{I} = \frac{1}{S*T}\sum_{s=0}^{S-1}\sum_{t=0}^{T-1} I(s, t),$$

wherein, S and T represent the maximum coordinates of the foreground image pixels, and the alternating component of the pixel gray scale information I is expressed as: $I'(s, t)=I(s,t)-\bar{I}$;

3, I'(s, t) is converted to spatial frequency as:

$$U(g, l) = \sum_{s=0}^{S-1}\sum_{t=0}^{T-1} I'(s, t)e^{-j\times 2\pi\left(\frac{s\times g}{S}+\frac{t\times l}{T}\right)},$$

wherein, g is 0, 1, 2, . . . , S−1, l=0, 1, 2, . . . , T−1, the maximum value of |U(g,l)| is taken as the maximum sharpness value Qf of the foreground image class.

4, Similarly, the maximum sharpness Qm and Qb of the medium image class and the background image class can be estimated.

S2, respectively acquiring an object of each image class to estimate sharpness value of the object of each image class, and classifying the object of each image class based on the maximum sharpness values corresponding to each image class.

Specifically, after the operation of obtaining a target image, classifying the target image to obtain corresponding multiple image classes, and calculating the maximum sharpness value corresponding to each image class, the 3D television respectively acquires an object of each image class to estimate sharpness value of the object of each image class, and according to the maximum sharpness value corresponding to each image class, classifies the object of each image class.

Wherein, the 3D television respectively detects boundaries and outlines of the items in the foreground image class, the medium image class and the background image class, and obtains the objects corresponding to the foreground image class, the medium image class and the background image class.

In the specific implementation, ways can be taken as follows:

1, by searching and detecting the boundary and outline of each item in the foreground image class, classifying and obtaining the object of each item in the foreground image class, labeled as q1, q2, . . . ;

2, by searching and detecting the boundary and outline of each item in the medium image class, classifying and obtaining the object of each item in the medium image class, labeled as z1, z2, . . . ;

3, by searching and detecting the boundary and outline of each item in the background image class, classifying and obtaining the object of each item in the background image class, labeled as b1, b2, . . . .

Wherein, after the operation of respectively detecting boundaries and outlines of the items in the foreground image class, the medium image class and the background image class, to obtain the objects corresponding to the foreground image class, the medium image class and the background image class, the 3D television based on the objects corresponding to the foreground image class, the medium image class and the background image class, respectively estimates the sharpness value of each object corresponding to the foreground image, the medium image, and the background image.

In the specific implementation, ways can be adopted as follows:

1, converting the object of each item q1, q2, . . . in the foreground image class into the HSI format, and similar with the above-mentioned maximum sharpness estimation method of the image classes, estimating the sharpness value of the object of each item, respectively as q1f, q2f, . . . ;

2, converting the object of each item z1, z2, . . . in the medium image class into the HSI format, and similar with the above-mentioned maximum sharpness estimation method of the image classes, estimating the sharpness value of the object of each item, respectively as z1f, z2f, . . . ;

3, converting the object of each item b1, b2, . . . in the background image class into the HSI format, and similar with the above-mentioned maximum sharpness estimation method of the image classes, estimating the sharpness value of the object of each item, respectively as b1f, b2f, . . . .

Wherein, after the operation of respectively estimating the sharpness value of each object corresponding to the foreground image class, the medium image class and the background image class, based on the objects corresponding to the foreground image class, the medium image class, and the background image class, the 3D television compares the sharpness value of any one of the objects in the foreground image class with the maximum sharpness value Qm of the medium image class.

Wherein, if the sharpness value of any one of the objects in the foreground image class is larger than or equal to the maximum sharpness value Qm of the medium image class, the object is classified into the medium image class, no longer subordinate to the foreground image class, and the sharpness value of the object is defined as the maximum sharpness value Qm of the medium image class.

Wherein, after the operation of comparing the sharpness value of any one of the objects in the foreground image class with the maximum sharpness value Qm of the medium image class, the 3D television compares the sharpness value of any one of the objects in the medium image class with the maximum sharpness value Qb of the background image class.

Wherein, if the sharpness value of any one of the objects in the medium image class is larger than or equal to the maximum sharpness value Qb of the background image class, the object is classified into the background image class, no longer subordinate to the medium image class, and the sharpness value of the object is defined as the maximum sharpness Qb of the background image class. These realize further adjustment of object classification, so as for the object in the medium image class of the three classified image classes with the best sharpness.

S3, estimating depth value of the object of each image class using a depth value estimation algorithm, based on the sharpness value of the classified object of each image class.

Specifically, after the operation of respectively acquiring an object of each image class to estimate sharpness value of the object of each image class, the 3D television estimates depth value of the object of each image class using a depth value estimation algorithm, based on the sharpness value of the classified object of each image class.

Wherein, the 3D television sets a reference sharpness Qs, and establishes a depth conversion function DP based on the reference sharpness Qs.

In the specific implementation, ways can be adopted as follows:
1, setting a reference sharpness Qs;
2, setting a depth conversion function DP(x), such as:

$$DP(i)=\beta(xi-Qs)/Qs$$

wherein, i is the object, xi is the sharpness value of object i, Qs is the reference sharpness, β is a setting coefficient, and the absolute depth value corresponding to Qs is 0.

Wherein, after the operation of setting a reference sharpness Qs, and establishing a DP conversion function based on the reference sharpness Qs, the 3D television sets the reference sharpness Qs as the maximum sharpness Qm of the medium image class, estimates the depth value of the object of the foreground image class using the DP conversion function; sets the reference sharpness Qs as the maximum sharpness Qb of the background image class, estimates the depth value of the object of the medium image class using the DP conversion function; sets the reference sharpness Qs as the maximum sharpness Qb of the background image class, estimates the depth value of the object of the background image class using the DP conversion function.

In the specific implementation, ways can be adopted as follows:
1, estimating depth values of the objects in the foreground image class, setting the reference sharpness Qs as the maximum sharpness value Qm of the medium image class, respectively substituting q1f, q2f . . . into the function DP(X) to obtain the depth value of each object q1, q2, . . . in the foreground image class:

$$DP(q1)=\beta(q1f-Qm)/Qm,$$

$$DP(q2)=\beta(q2f-Qm)/Qm,$$

. . . , wherein, each depth value is smaller than 0;
2, estimating depth values of the objects in the medium image class, setting the reference sharpness Qs as the maximum sharpness value Qb of the background image class, respectively substituting z1f, z2f . . . into the function DP(X) to obtain the depth value of each object z1, z2, . . . in the medium image class:

$$DP(z1)=\beta(z1f-Qb)/Qb,$$

$$DP(z2)=\beta(z2f-Qb)/Qb,$$

. . . , wherein, each depth value is larger than 0.
3, estimating depth values of the objects in the background image class, setting the reference sharpness Qs as the maximum sharpness value Qb of the background image class, respectively substituting b1f, b2f . . . into the function DP(X) to obtain the depth value of each object b1, b2, . . . in the background image class:

$$DP(b1)=\beta(b1f-Qb)/Qb,$$

$$DP(b2)=\beta(b2f-Qb)/Qb,$$

. . . , wherein, each depth value is smaller than or equal to 0.

S4, estimating depth of field value of the object of each image class using a depth of field value estimation algorithm, based on the depth value of the object of each image class.

Specifically, after the operation of estimating depth value of the object of each image class using a depth value estimation algorithm, based on the sharpness value of the classified object of each image class, the 3D television estimates depth of field value of the object of each image class using a depth of field value estimation algorithm, based on the depth value of the object of each image class.

Wherein, the 3D television performs linear conversion on the depth value of the object in the medium image class using a linear function Line, to estimate the depth of field value of the object in the medium image class.

In the specific implementation, ways can be adopted as follows:
1, setting a linear function Line(y)=g*DP(y), wherein y is an item object, g is a setting proportional coefficient;
2, substituting the depth value DP(z1), DP(z2), . . . of each item object z1, z2, . . . in the medium image class into the Line function, to obtain the depth of field values of z1, z2, . . . , respectively as g DP(z1), g DP(z2), . . . .

Wherein, after the operation of performing linear conversion on the depth value of the object in the medium image class using a linear function Line, to estimate the depth of field value of the object in the medium image class, the 3D television performs nonlinear compression conversion on the depth value of the object in the background image class using a curve function Curve, to estimate the depth of field value of the object in the background image class.

In the specific implementation, ways can be adopted as follows:

1, setting a curve function Curve(w), w representing the depth value of an item object;
2, substituting the depth value DP(b1), DP(b2), . . . of each item object b1, b2, . . . in the background image class into the Curve function, to obtain the depth of field values of b1, b2, . . . , respectively as Curve[DP(b1)], Curve[DP(b2)], . . . .

Wherein, after the operation of performing nonlinear compression conversion on the depth value of the object in the background image class using a curve function Curve, to estimate the depth of field value of the object in the background image class, the 3D television performs nonlinear compression conversion on the depth value of the object in the foreground image class using the curve function Curve, and superimposes the maximum value in the depth values of the objects of the medium image class, to estimate the depth of field value of the object in the foreground image class.

In the specific implementation, ways can be adopted as follows:

1, by using the above curve function Curve(w), substituting the depth value DP(q1), DP(q2), . . . of each item object q1, q2, . . . in the foreground image class into the H function, to obtain relative depth of field values of z1, z2, . . . , respectively as Curve[DP(q1)], Curve[DP(q2)], . . . ;
2, superimposing the maximum depth of field value g DP(Qm) in the medium image class, Qm representing the maximum sharpness value in the medium image class, to obtain the depth of field value of each object q1, q2, . . . in the foreground image class, respectively as g DP(Qm)-Curve[DP(q1)], g DP(Qm)-Curve[DP(q2)], . . . .

Wherein, the above depth of field estimation of the object in the background image class and the foreground image class use the same curve function Curve, and can also use different curve functions Curve. The curve function Curve has the following characteristics:

1, the converted depth of field value and the depth value have the same positive and negative value, namely if the depth value of an object is negative, then the depth of field value of the object is negative, and if the depth value of an object is positive, then the depth of field value of the object is positive;
2, the smaller the depth value is, the smaller the depth of field value is, and the larger the depth value is, the larger the depth of field value is; for example, when the depth value is −50, Curve(−50)=−40, and when the depth value is −100, Curve(−100)=−60, Curve(−50)>Curve(−100);
3, the smaller the absolute depth value is, the smaller the compression ratio is, and the larger the absolute depth value is, the larger the compression ratio is; for example, when the depth value is −50, Curve(−50)=−40, the compression ratio is 0.2, and when the depth value is −100, Curve(−100)=−60, the compression ratio is 0.4.

From the above processes, the depth of field value of the object in the medium image class is under linear change as the depth value of the object changes, while the depth of field value of the object in the foreground image class and the background image class is under nonlinear compression change as the depth value changes, and the larger the absolute depth value is, the larger the compression ratio is.

In accordance with the above solution, the present disclosure provides a two-dimensional image depth of field generation method, which realizes generating depth of field from the two-dimensional image, so as to reduce image distortion and improve image stability, thereby satisfying the demand of users.

Figure 2:
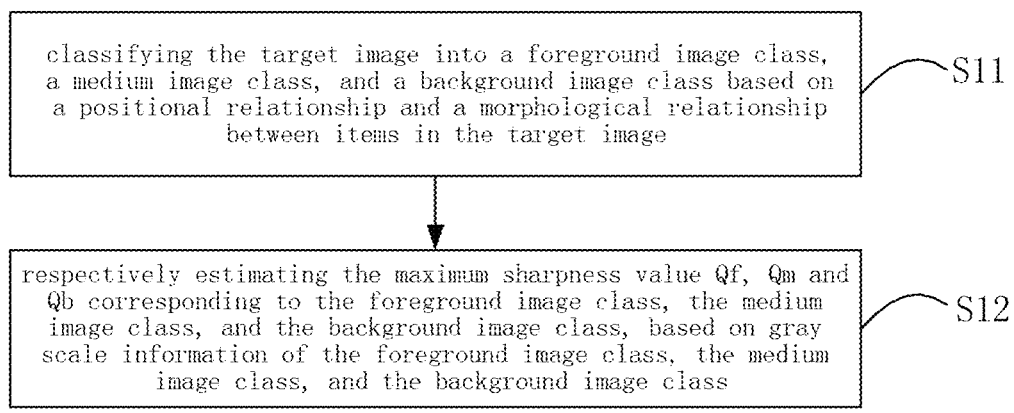
FIG. 2 is an illustrative flowchart of obtaining a target image, classifying the target image to obtain corresponding multiple image classes, and calculating the maximum sharpness value corresponding to each image class according to this disclosure.

Further, in order to better realize depth of field generation from the two-dimensional image, referring to FIG. 2, FIG. 2 is an illustrative flowchart of obtaining a target image, classifying the target image to obtain corresponding multiple image classes, and calculating the maximum sharpness value corresponding to each image class according to this disclosure.

As an embodiment, the above step S1 includes:

S11, classifying the target image into a foreground image class, a medium image class, and a background image class based on a positional relationship and a morphological relationship between items in the target image.

Specifically, the 3D television according to a positional relationship and a morphological relationship between items in the target image, classifies the target image into the foreground image class, the medium image class and the background image class.

Wherein, the above target image may be a two-dimensional image. The 3D television according to a positional and relatively directional relationship of items in the two-dimensional image, such as distance, adjacency, overlap and so on, combined with shapes, gestures and shadow hints of items and so on, classifies the items into the foreground image class, the medium image class and the background image class.

S12, respectively estimating the maximum sharpness value Qf, Qm and Qb corresponding to the foreground image class, the medium image class, and the background image class, based on gray scale information of the foreground image class, the medium image class, and the background image class.

Specifically, after the operation of classifying the target image into a foreground image class, a medium image class, and a background image class based on a positional relationship and a morphological relationship between items in the target image, the 3D television respectively estimates the maximum sharpness value Qf, Qm and Qb corresponding to the foreground image class, the medium image class, and the background image class, based on gray scale information of the foreground image class, the medium image class, and the background image class.

Wherein, the 3D television first converts the foreground image class, the medium image class and the background image class into the HSI format (H is chrominance information, S is color saturation information, and I is gray scale information); then processes the gray scale information I of the foreground image class, the medium image class and the background image class, to obtain alternating component I' of the gray scale information I, and according to the maximum frequency in the spectral characteristic of I', estimates the maximum sharpness values of the foreground image, the medium image, and the background image, respectively as Qf, Qm and Qb.

Wherein, in the specific implementation, the maximum sharpness estimation of the foreground image class is taken as an example:

1, each pixel of the foreground image is expressed by RGB, as {R(s, t), G(s, t), B(s, t)}, wherein, s and t respectively represent a row coordinate and a column coordinate; by converting the RGB to the HSI format, pixel gray scale information is expressed as: I(s,t)=[R(s,t)+G(s,t)+B(s,t)]/3;

2, an average gray scale value of the foreground image is expressed as:

$$\bar{I} = \frac{1}{S*T}\sum_{s=0}^{S-1}\sum_{t=0}^{T-1} I(s, t),$$

wherein, S and T represent the maximum coordinates of the foreground image pixels, and the alternating component of the pixel gray scale information I is expressed as: I'(s, t)=I(s, t)−Ī;

3, I'(s, t) is converted to spatial frequency as:

$$U(g, l) = \sum_{s=0}^{S-1}\sum_{t=0}^{T-1} I'(s, t)e^{-j\times 2\pi\left(\frac{s\times g}{S}+\frac{t\times l}{T}\right)},$$

wherein, g is 0, 1, 2, . . . , S−1, l=0, 1, 2, . . . , T−1, the maximum value of |U(g,l)| is taken as the maximum sharpness value Qf of the foreground image class.

4, Similarly, the maximum sharpness Qm and Qb of the medium image class and the background image class can be estimated.

In accordance with the above solution, the present disclosure provides a two-dimensional image depth of field generation method, which realizes generating depth of field from the two-dimensional image, so as to reduce image distortion and improve image stability, thereby satisfying the demand of users.

Figure 3:
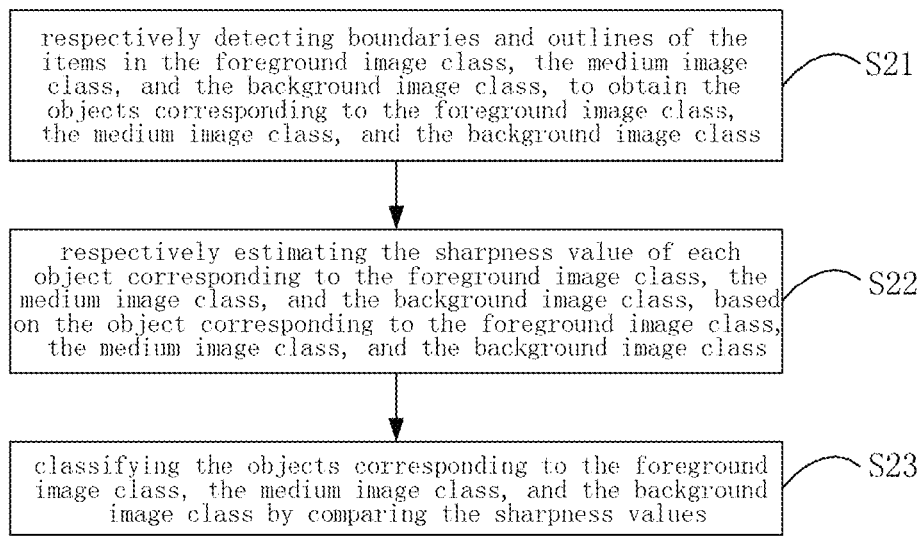
FIG. 3 is an illustrative flowchart of respectively acquiring an object of each image class to estimate sharpness value of the object of each image class according to this disclosure.

Further, in order to better realize depth of field generation from the two-dimensional image, referring to FIG. 3, FIG. 3 is an illustrative flowchart of respectively obtaining an object of each image class to estimate sharpness value of the object of each image class according to this disclosure.

As an embodiment, the above step S2 includes:

S21, respectively detecting boundaries and outlines of the items in the foreground image class, the medium image class, and the background image class, to obtain the objects corresponding to the foreground image class, the medium image class, and the background image class.

Specifically, after the operation of obtaining a target image, classifying the target image to obtain corresponding multiple image classes, and calculating the maximum sharpness value corresponding to each image class, the 3D television respectively detects boundaries and outlines of the items in the foreground image class, the medium image class and the background image class, to obtain the objects corresponding to the foreground image class, the medium image class and the background image class.

Wherein, the 3D television respectively detects boundaries and outlines of the items in the foreground image class, the medium image class and the background image class, and obtains the objects corresponding to the foreground image class, the medium image class and the background image class.

In the specific implementation, ways can be taken as follows:

1, by searching and detecting the boundary and outline of each item in the foreground image class, classifying and obtaining the object of each item in the foreground image class, labeled as q1, q2, . . . ;

2, by searching and detecting the boundary and outline of each item in the medium image class, classifying and obtaining the object of each item in the medium image class, labeled as z1, z2, . . . ;

3, by searching and detecting the boundary and outline of each item in the background image class, classifying and obtaining the object of each item in the background image class, labeled as b1, b2, . . . ;

S22, respectively estimating the sharpness value of each object corresponding to the foreground image class, the medium image class, and the background image class, based on the objects corresponding to the foreground image class, the medium image class, and the background image class.

Specifically, after the operation of respectively detecting boundaries and outlines of the items in the foreground image class, the medium image class and the background image class, to obtain the objects corresponding to the foreground image class, the medium image class and the background image class, the 3D television respectively estimates the sharpness value of each object corresponding to the foreground image class, the medium image class, and the background image class, based on the objects corresponding to the foreground image class, the medium image class, and the background image class.

In the specific implementation, ways can be adopted as follows:

1, converting the object of each item q1, q2, . . . in the foreground image class into the HSI format, and similar with the above-mentioned maximum sharpness estimation method of the image classes, estimating the sharpness value of the object of each item, respectively as q1f, q2f, . . . ;

2, converting the object of each item z1, z2, . . . in the medium image class into the HSI format, and similar with the above-mentioned maximum sharpness estimation method of the image classes, estimating the sharpness value of the object of each item, respectively as z1f, z2f, . . . ;

3, converting the object of each item b1, b2, . . . in the background image class into the HSI format, and similar with the above-mentioned maximum sharpness estimation method of the image classes, estimating the sharpness value of the object of each item, respectively as b1f, b2f, . . . .

S23, classifying the objects corresponding to the foreground image class, the medium image class, and the background image class by comparing the sharpness values.

Specifically, after the operation of based on the objects corresponding to the foreground image class, the medium image class and the background image class, respectively estimating the sharpness value of each object corresponding to the foreground image class, the medium image class and the background image class, the 3D television classifies the objects corresponding to the foreground image class, the medium image class and the background image class by comparing the sharpness values.

First, the 3D television compares the sharpness value of any one of the objects in the foreground image class with the maximum sharpness value Qm of the medium image class.

Wherein, if the sharpness value of any one of the objects in the foreground image class is larger than or equal to the maximum sharpness value Qm of the medium image class, the object is classified into the medium image class, no longer subordinate to the foreground image class, and the sharpness value of the object is defined as the maximum sharpness value Qm of the medium image class.

Then, the 3D television compares the sharpness value of any one of the objects in the medium image class with the maximum sharpness value Qb of the background image class.

Wherein, if the sharpness value of any one of the objects in the medium image class is larger than or equal to the maximum sharpness value Qb of the background image class, the object is classified into the background image class, no longer subordinate to the medium image class, and the sharpness value of the object is defined as the maximum sharpness Qb of the background image class. These realize further adjustment of objects classification, so as for the object in the medium image class of the three classified image classes with the best sharpness.

In accordance with the above solution, the present disclosure provides a two-dimensional image depth of field generation method, which better realizes generating depth of field from the two-dimensional image, so as to reduce image distortion and improve image stability, thereby satisfying the demand of users.

Figure 4:
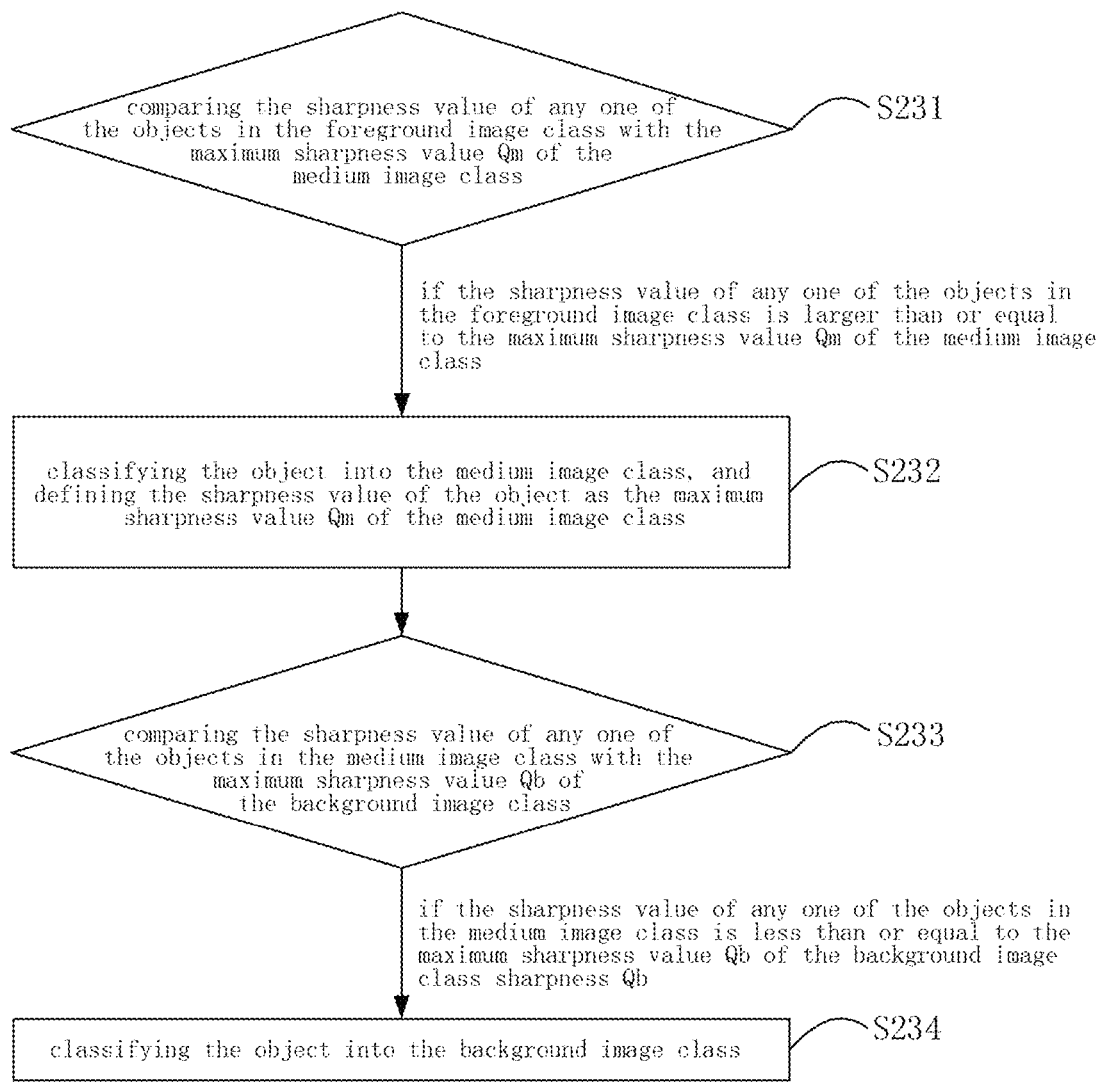
FIG. 4 is an illustrative flowchart of classifying the objects corresponding to the foreground image class, the medium image class, and the background image class by comparing the sharpness values according to this disclosure.

Further, in order to better realize depth of field generation from the two-dimensional image, referring to FIG. 4, FIG. 4 is an illustrative flowchart of by comparing the sharpness values, classifying the object corresponding to the foreground image class, the medium image class and the background image class according to this disclosure.

As an embodiment, the above step S3 includes:

S231, comparing the sharpness value of any one of the objects in the foreground image class with the maximum sharpness value Qm of the medium image class.

Specifically, after the step of respectively estimating the sharpness value of each object corresponding to the foreground image class, the medium image class and the background image class based on the objects corresponding to the foreground image class, the medium image class and the background image class, the 3D television compares the sharpness value of any one of the objects in the foreground image class with the maximum sharpness value Qm of the medium image class.

S232, classifying the object into the medium image class, and defining the sharpness value of the object as the maximum sharpness value Qm of the medium image class, if the sharpness value of any one of the objects in the foreground image class is larger than or equal to the maximum sharpness value Qm of the medium image class.

Specifically, if the sharpness value of any one of the objects in the foreground image class is larger than or equal to the maximum sharpness value Qm of the medium image class, the object is classified into the medium image class, no longer subordinate to the foreground image class, and the sharpness value of the object is defined as the maximum sharpness value Qm of the medium image class.

S233, comparing the sharpness value of any one of the objects in the medium image class with the maximum sharpness value Qb of the background image class.

Specifically, after the operation of comparing the sharpness value of any one of the objects in the foreground image class with the maximum sharpness value Qm of the medium image class, the 3D television compares the sharpness value of any one of the objects in the medium image class with the maximum sharpness value Qb of the background image class.

S234, classifying the object into the background image class, if the sharpness value of any one of the objects in the medium image class is less than or equal to the maximum sharpness value Qb of the background image class sharpness Qb.

Specifically, if the sharpness value of any one of the objects in the medium image class is larger than or equal to the maximum sharpness value Qb of the background image class, the object is classified into the background image class, no longer subordinate to the medium image class, and the sharpness value of the object is defined as the maximum sharpness Qb of the background image class. These realize further adjustment of object classification, so as for the object in the medium image class of the three classified image classes with the best sharpness.

In accordance with the above solution, the present disclosure provides a two-dimensional image depth of field generation method, which better realizes generating depth of field from the two-dimensional image, so as to reduce image distortion and improve image stability, thereby satisfying the demand of users.

Figure 5:
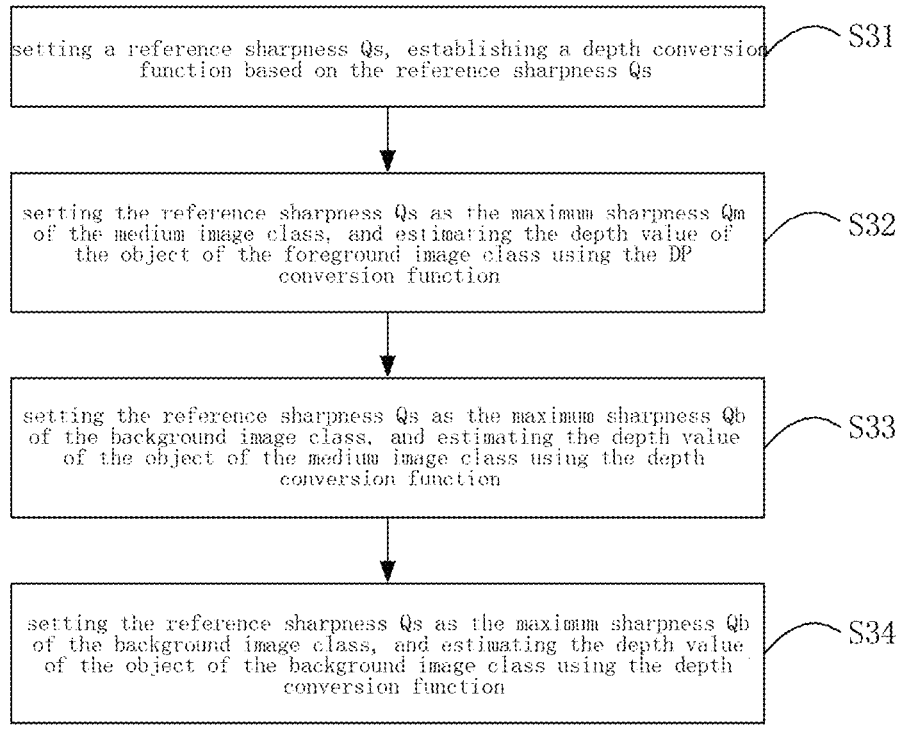
FIG. 5 is an illustrative flowchart of estimating depth value of the object of each image class using a depth value estimation algorithm, based on the sharpness value of the object of each image class according to this disclosure.

Further, in order to better realize depth of field generation from the two-dimensional image, referring to FIG. 5, FIG. 5 is an illustrative flowchart of according to the sharpness value of the classified object of each image class, by a depth value estimation algorithm, estimating depth value of the object of each image class according to this disclosure.

As an embodiment, the above step S3 includes:

S31, setting a reference sharpness Qs, establishing a DP conversion function based on the reference sharpness Qs.

Specifically, after the operation of respectively obtaining an object of each image class to estimate sharpness value of the object of each image class, the 3D television based on the sharpness value of the classified object of each image class, by using a depth value estimation algorithm, estimate depth value of the object of each image class.

In the specific implementation, ways can be adopted as follows:

1, setting a reference sharpness Qs;
2, setting a depth conversion function DP(x), such as:

$DP(i)=\beta(xi-Qs)/Qs$ wherein, i is the object, xi is the sharpness value of object i, Qs is the reference sharpness, β is a setting coefficient, and the absolute depth value corresponding to Qs is 0.

S32, setting the reference sharpness Qs as the maximum sharpness Qm of the medium image class, and estimating the depth value of the object of the foreground image class using the DP conversion function.

Specifically, after the operation of setting a reference sharpness Qs, and establishing a depth conversion function based on the reference sharpness Qs, the 3D television sets the reference sharpness Qs as the maximum sharpness Qm of the medium image class, estimates depth value of the object of the foreground image class using the DP conversion function.

Wherein, in the specific implementation, ways can be adopted as follows:

estimating depth values of the objects in the foreground image class, setting the reference sharpness Qs as the maximum sharpness value Qm of the medium image class, respectively substituting q1f, q2f . . . into the function DP(X) to obtain the depth value of each object q1, q2, . . . in the foreground image class:

$$DP(q1)=\beta(q1f-Qm)/Qm,$$

$$DP(q2)=\beta(q2f-Qm)/Qm,$$

. . . , wherein, each depth value is smaller than 0.

S33, setting the reference sharpness Qs as the maximum sharpness Qb of the background image class, and estimating the depth value of the object of the medium image class using the DP conversion function.

Specifically, after the operation of setting a reference sharpness Qs, establishing a depth conversion function based on the reference sharpness Qs, the 3D television sets the reference sharpness Qs as the maximum sharpness Qb of the background image class, and estimates the depth value of the object of the medium image class using the DP conversion function.

Wherein, in the specific implementation, ways can be adopted as follows:

estimating depth values of the objects in the medium image class, setting the reference sharpness Qs as the maximum sharpness value Qb of the background image class, respectively substituting z1f, z2f . . . into the function DP(X) to obtain the depth value of each object z1, z2, . . . in the medium image class:

$$DP(z1)=\beta(z1f-Qb)/Qb,$$

$$DP(z2)=\beta(z2f-Qb)/Qb,$$

. . . , wherein, each depth value is larger than 0.

S34, setting the reference sharpness Qs as the maximum sharpness Qb of the background image class, and estimating the depth value of the object of the background image class using the DP conversion function.

Specifically, after the operation of setting a reference sharpness Qs, establishing a DP conversion function based on the reference sharpness Qs, the 3D television sets the reference sharpness Qs as the maximum sharpness Qb of the background image class, and estimates the depth value of the object of the background image class using the DP conversion function.

Wherein, estimating depth values of the objects in the background image class, setting the reference sharpness Qs as the maximum sharpness value Qb of the background image class, respectively substituting b1f, b2f . . . into the function DP(X) to obtain the depth value of each object b1, b2, . . . in the background image class:

$$DP(b1)=\beta(b1f-Qb)/Qb,$$

$$DP(b2)=\beta(b2f-Qb)/Qb,$$

. . . , wherein, each depth value is smaller than or equal to 0.

In accordance with the above solution, the present disclosure provides a two-dimensional image depth of field generation method, which better realizes generating depth of field from the two-dimensional image, so as to reduce image distortion and improve image stability, thereby satisfying the demand of users.

Figure 6:
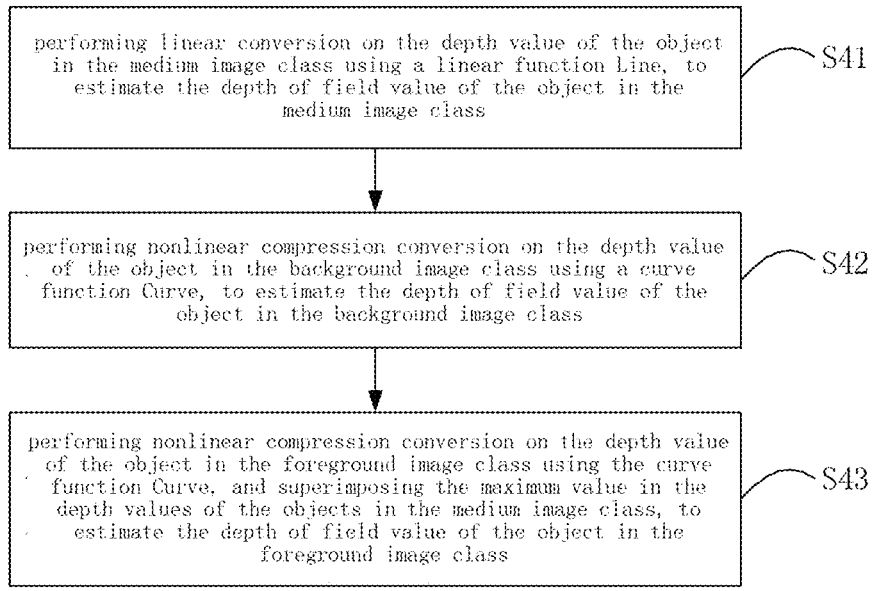
FIG. 6 is an illustrative flowchart of estimating depth of field value of the object of each image class using a depth of field value estimation algorithm, based on the depth value of the object of each image class according to this disclosure.

Further, in order to better realize depth of field generation from the two-dimensional image, referring to FIG. 6, FIG. 6 is an illustrative flowchart of according to the depth value of the object of each image class, by a depth of field value estimation algorithm, estimating depth of field value of the object of each image class according to this disclosure.

As an embodiment, the above step S4 includes:

S41, performing linear conversion on the depth value of the object in the medium image class using a linear function Line, to estimate the depth of field value of the object in the medium image class.

Specifically, after the operation of estimating depth value of the object of each image class using a depth value estimation algorithm, based on the sharpness value of the classified object of each image class, the 3D television performs linear conversion on the depth value of the object of the medium image class using a linear function Line, to estimate depth of field value of the object of the medium image class.

Wherein, in the specific implementation, ways can be adopted as follows:

1, setting a linear function Line(y)=g*DP(y), wherein y is an item object, g is a setting proportional coefficient;
2, substituting the depth value DP(z1), DP(z2), . . . of each item object z1, z2, . . . in the medium image class into the Line function, to obtain the depth of field values of z1, z2, . . . , respectively as g DP(z1), g DP(z2), . . . .

S42, performing nonlinear compression conversion on the depth value of the object in the background image class using a curve function Curve, to estimate the depth of field value of the object in the background image class.

Specifically, after the operation of performing linear conversion on the depth value of the object of the medium image class using a linear function Line, to estimate the depth of field value of the object of the medium image class, the 3D television performs nonlinear compression conversion on the depth value of the object of the background image class using a curve function Curve, to estimate the depth of field value of the object of the background image class.

In the specific implementation, ways can be adopted as follows:

1, setting a curve function Curve(w), w representing the depth value of an item object;
2, substituting the depth value DP(b1), DP(b2), . . . of each item object b1, b2, . . . in the background image class into the Curve function, to obtain the depth of field values of b1, b2, . . . , respectively as Curve[DP(b1)], Curve[DP(b2)] . . . .

S43, performing nonlinear compression conversion on the depth value of the object in the foreground image class using the curve function Curve, and superimposing the maximum values of the depth values of the objects in the medium image class, to estimate the depth of field value of the object in the foreground image class.

Specifically, after the operation of performing nonlinear compression conversion on the depth value of the object of the background image class using a curve function Curve, to estimate the depth of field value of the object of the background image class, the 3D television performs nonlinear compression conversion on the depth value of the object of the foreground image class using the curve function Curve, and superimposes the maximum value of the depth values the objects in the medium image class to estimate the depth of field value of the object in the foreground image class.

In the specific implementation, ways can be adopted as follows:

1, by using the above curve function Curve(w), substituting the depth value DP(q1), DP(q2), . . . of each item object q1, q2, . . . in the foreground image class into the H function, to obtain relative depth of field values of z1, z2, . . . , respectively as Curve[DP(q1)], Curve[DP(q2)], . . . ;

2, superimposing the maximum depth of field value g DP(Qm) in the medium image class, Qm representing the maximum sharpness value in the medium image class, to obtain the depth of field value of each object q1, q2, . . . in the foreground image class, respectively as g DP(Qm)-Curve[DP(q1)], g DP(Qm)-Curve[DP(q2)], . . . .

Wherein, the above depth of field estimation of the object in the background image class and the foreground image class use the same curve function Curve, and also can use different curve functions Curve. The curve function Curve has the following characteristics:

1, the converted depth of field value and the depth value have the same positive and negative value, namely if the depth value of an object is negative, then the depth of field value of the object is negative, and if the depth value of an object is positive, then the depth of field value of the object is positive;

2, the smaller the depth value is, the smaller the depth of field value is, and the larger the depth value is, the larger the depth of field value is; for example, when the depth value is −50, Curve(−50)=−40, and when the depth value is −100, Curve(−100)=−60, Curve(−50)>Curve(−100);

3, the smaller the absolute depth value is, the smaller the compression ratio is, and the larger the absolute depth value is, the larger the compression ratio is; for example, when the depth value is −50, Curve(−50)=−40, the compression ratio is 0.2, and when the depth value is −100, Curve(−100)=−60, the compression ratio is 0.4.

From the above processes, the depth of field value of the object in the medium image class is under linear change as the depth value of the object changes, while the depth of field value of the object in the foreground image class and the background image class is under nonlinear compression change as the depth value changes, and the larger the absolute depth value is, the larger the compression ratio is.

In accordance with the above solution, the present disclosure provides a two-dimensional image depth of field generation method, which better realizes generating depth of field from the two-dimensional image, so as to reduce image distortion and improve image stability, thereby satisfying the demand of users.

Figure 7:
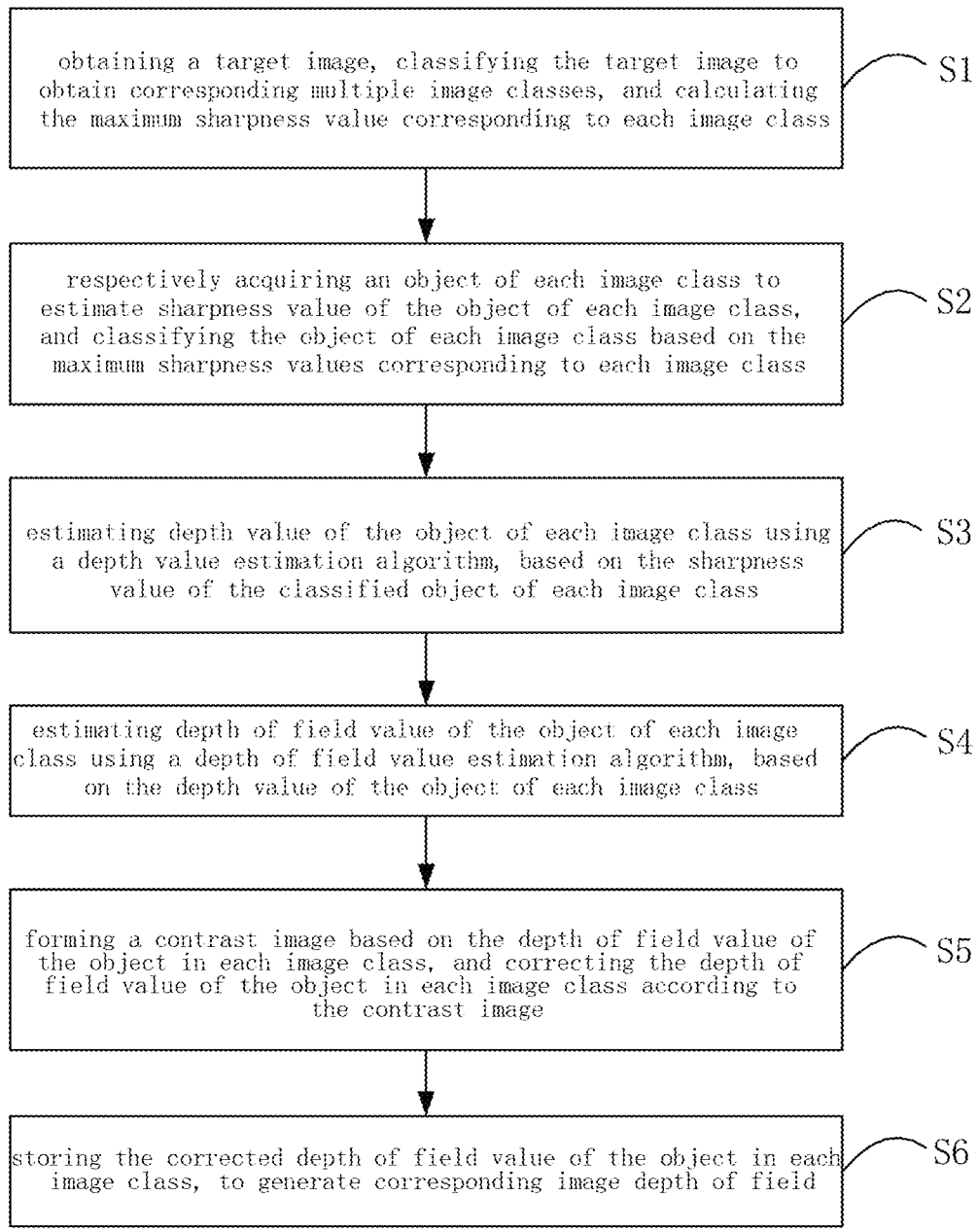
FIG. 7 is an illustrative flowchart of a second embodiment of a two-dimensional image depth of field generation method according to this disclosure.

As illustrated in FIG. 7, the present disclosure provides a second embodiment of a two-dimensional image depth of field generation method, after the step S4 in the method of the above first embodiment, this embodiment further includes:

As an embodiment, the above step S4 includes:

S5, forming a contrast image based on the depth of field value of the object in each image class, and correcting the depth of field value of the object in each image class according to the contrast image.

Specifically, after the operation of estimating depth of field value of the object of each image class using a depth of field value estimation algorithm, based on the depth value of the object of each image class, the 3D television sorts and superimposes the objects in the medium image class according to the depth of field values of the objects in the medium image class, to form the contrast image.

Wherein, in specific implementation, the object z1, z2, . . . in the medium image class may be sorted and superimposed according to the magnitude of the depth of field value g DP(z1), g DP(z2), . . . thereof, and the object with larger depth of field value is arranged on top of the object with smaller depth of field value, to form the contrast image.

After the operation of sorting and superimposing the objects in the medium image class based on the depth of field values of the objects in the medium image class, to form the contrast image, the 3D television compares spatial relationship of each object in the contrast image and the medium image class, to adjust the depth of field values of the objects in the medium image class.

Wherein, in specific implementation, the spatial relationship, such as occlusion, position and so on, of each object in the contrast image and the original medium image can be compared. For the object having abnormal spatial position relationship, taking the object with larger depth of field value as a reference, the depth of field value of the object with smaller depth of field value is adjusted symmetrically, the depth of field values of the objects in the medium image class are adjusted. For example, the depth of field value of the object z1 is 100, which is obtained by the above depth of field value estimation, the depth of field value of the object z2 is 80, in the new medium image, z1 is superimposed on top of z2, while in the original medium image z2 is on top of z1. Therefore, symmetrical depth of field adjustment is performed on z1 and z2: taking z1 as the reference, namely the depth of field value of z1 remains unchanged at 100, the depth of field value of z2 is adjusted to 80+2*(100−80), that is 120.

After the operation of comparing spatial relationship of each object in the contrast image and the medium image class, to adjust the depth of field values of the objects in the medium image class, the 3D television determines whether the depth of field values of the objects in the medium image class change.

If there is change in the depth of field values of the objects of the medium image class, it's to obtain the maximum change in the depth of field values of the objects in the medium image class, and superimpose the maximum change in the depth of field values of the objects in the medium image class on the depth of field values of the objects in the foreground image class. For example, the maximum depth of field value g DP(Qm) of the medium image class obtained by the above object depth of field value estimation is 500, after the above second step, the maximum depth of field value of the medium image class is adjusted to 550, namely the change is 50, then the depth of field values of all the objects in the foreground image class are increased by 50 to form new depth of field values.

If there is no change in the depth of field values of the objects in the medium image class, no adjustment is performed on the depth of field values of the objects in the foreground image class.

S6, storing the corrected depth of field value of the object in each image class, to generate corresponding image depth of field.

Specifically, after the operation of correcting the depth of field value of the object of each image class, the 3D television stores the corrected depth of field value of the object of each image class, to generated corresponding image depth of filed.

Wherein, the 3D television stores the corrected depth of field values of the objects in the foreground image class, the medium image class and the background image class, so as to form depth of field of the two-dimensional image. The depth of field can be stored in a local storage device for instant extraction.

In accordance with the above solution, the present disclosure provides a two-dimensional image depth of field generation method, which better realizes generating depth of field from the two-dimensional image, so as to reduce image distortion and improve image stability, thereby satisfying the demand of users.

Based on the above implement of method embodiments, the present disclosure also provides a two-dimensional image depth of field generation device.

Figure 8:
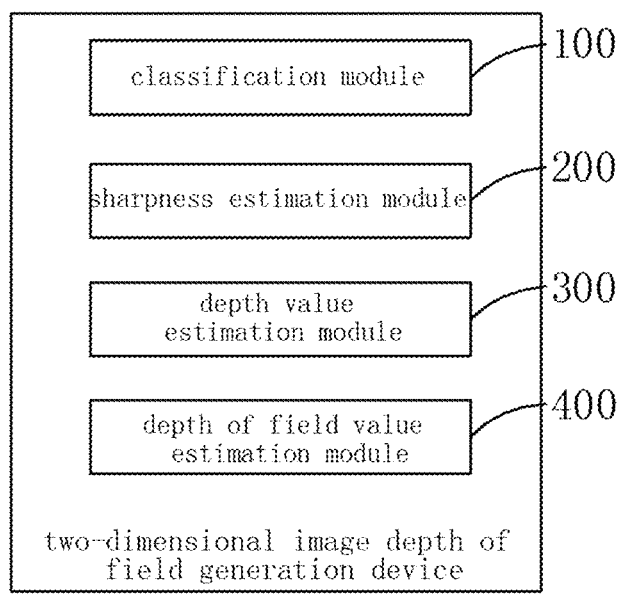
FIG. 8 is a functional diagram of a first embodiment of a two-dimensional image depth of field generation device according to this disclosure.

As illustrated in FIG. 8, a first embodiment according to the present disclosure provides a two-dimensional image depth of field generation device, including:

a classification module 100, configured to obtain a target image, classify the target image to obtain corresponding multiple image classes, and calculate the maximum sharpness value corresponding to each image class.

An executive body of the method according to the present disclosure may be a 3D television. Although the executive body in this embodiment is exemplified by the 3D television, it is of course not limited to other devices which are capable of realizing 3D image display.

Specifically, the classification module 100 obtains a target image, classifies the target image to obtain corresponding multiple image classes, and calculates the maximum sharpness value corresponding to each image class.

Wherein, the classification module 100 according to a positional relationship and a morphological relationship between items in the target image, classifies the target image into the foreground image class, the medium image class and the background image class.

Wherein, the above target image may be a two-dimensional image. The classification module 100 according to a positional and relatively directional relationship of items in the two-dimensional image, such as distance, adjacency, overlap and so on, combined with shapes, gestures and shadow hints of items and so on, classifies the items into the foreground image class, the medium image class and the background image class.

Wherein, after the operation of classifying the target image into a foreground image class, a medium image class, and a background image class based on a positional relationship and a morphological relationship between items in the target image, the classification module 100 respectively estimates the maximum sharpness value Qf, Qm and Qb corresponding to the foreground image class, the medium image class and the background image class, based on gray scale information of the foreground image class, the medium image class, and the background image class.

Wherein, the classification module 100 first converts the foreground image class, the medium image class and the background image class into the HSI format (H is chrominance information, S is color saturation information, and I is gray scale information); then processes the gray scale information I of the foreground image class, the medium image class and the background image class, to obtain alternating component I' of the gray scale information I, and according to the maximum frequency in the spectral characteristic of I', estimates the maximum sharpness values of the foreground image, the medium image, and the background image, respectively as Qf, Qm and Qb.

Wherein, in the specific implementation, the maximum sharpness estimation of the foreground image class is taken as an example:

1, each pixel of the foreground image is expressed by RGB, as {R(s, t), G(s, t), B(s, t)}, wherein, s and t respectively represent a row coordinate and a column coordinate; by converting the RGB to the HSI format, pixel gray scale information is expressed as: I(s,t)=[R(s,t)+G(s,t)+B(s,t)]/3;

2, an average gray scale value of the foreground image is expressed as:

$$\bar{I} = \frac{1}{S*T}\sum_{s=0}^{S-1}\sum_{t=0}^{T-1} I(s, t),$$

wherein, S and T represent the maximum coordinates of the foreground image pixels, and the alternating component of the pixel gray scale information I is expressed as: I'(s, t)=I(s,t)−$\bar{I}$;

3, I'(s, t) is converted to spatial frequency as:

$$U(g, l) = \sum_{s=0}^{S-1}\sum_{t=0}^{T-1} I'(s, t)e^{-j\times 2\pi\left(\frac{s\times g}{S}+\frac{t\times l}{T}\right)},$$

wherein, g is 0, 1, 2, ..., S−1, l=0, 1, 2, ..., T−1, the maximum value of |U(g,l)| is taken as the maximum sharpness value Qf of the foreground image class.

4, Similarly, the maximum sharpness Qm and Qb of the medium image class and the background image class can be estimated.

a sharpness estimation module 200, configured to respectively acquire an object of each image class to estimate sharpness value of the object of each image class, and classify the object of each image class based on the maximum sharpness values corresponding to each image class.

Specifically, after the operation of obtaining a target image, classifying the target image to obtain corresponding multiple image classes, and calculating the maximum sharpness value corresponding to each image class, the sharpness estimation module 200 respectively acquires an object of each image class to estimate sharpness value of the object of each image class, and according to the maximum sharpness value corresponding to each image class, classifies the object of each image class.

Wherein, the sharpness estimation module 200 respectively detects boundaries and outlines of the items in the foreground image class, the medium image class and the background image class, and obtains the objects corresponding to the foreground image class, the medium image class and the background image class.

In the specific implementation, ways can be taken as follows:

1, by searching and detecting the boundary and outline of each item in the foreground image class, classifying and obtaining the object of each item in the foreground image class, labeled as q1, q2, . . . ;

2, by searching and detecting the boundary and outline of each item in the medium image class, classifying and obtaining the object of each item in the medium image class, labeled as z1, z2, . . . ;

3, by searching and detecting the boundary and outline of each item in the background image class, classifying and obtaining the object of each item in the background image class, labeled as b1, b2, . . . .

Wherein, after the operation of respectively detecting boundaries and outlines of the items in the foreground image class, the medium image class and the background image class, to obtain the objects corresponding to the foreground image class, the medium image class and the background image class, the sharpness estimation module 200 based on the objects corresponding to the foreground image class, the medium image class and the background image class, respectively estimates the sharpness value of each object corresponding to the foreground image, the medium image, and the background image.

In the specific implementation, ways can be adopted as follows:

1, converting the object of each item q1, q2, . . . in the foreground image class into the HSI format, and similar with the above-mentioned maximum sharpness estimation method of the image classes, estimating the sharpness value of the object of each item, respectively as q1$f$, q2$f$, . . . ;

2, converting the object of each item z1, z2, . . . in the medium image class into the HSI format, and similar with the above-mentioned maximum sharpness estimation method of the image classes, estimating the sharpness value of the object of each item, respectively as z1$f$, z2$f$, . . . ;

3, converting the object of each item b1, b2, . . . in the background image class into the HSI format, and similar with the above-mentioned maximum sharpness estimation method of the image classes, estimating the sharpness value of the object of each item, respectively as b1$f$, b2$f$, . . . .

Wherein, after the operation of respectively estimating the sharpness value of each object corresponding to the foreground image class, the medium image class and the background image class, based on the objects corresponding to the foreground image class, the medium image class, and the background image class, the sharpness estimation module 200 compares the sharpness value of any one of the objects in the foreground image class with the maximum sharpness value Qm of the medium image class.

Wherein, if the sharpness value of any one of the objects in the foreground image class is larger than or equal to the maximum sharpness value Qm of the medium image class, the object is classified into the medium image class, no longer subordinate to the foreground image class, and the sharpness value of the object is defined as the maximum sharpness value Qm of the medium image class.

Wherein, after the operation of comparing the sharpness value of any one of the objects in the foreground image class with the maximum sharpness value Qm of the medium image class, the sharpness estimation module 200 compares the sharpness value of any one of the objects in the medium image class with the maximum sharpness value Qb of the background image class.

Wherein, if the sharpness value of any one of the objects in the medium image class is larger than or equal to the maximum sharpness value Qb of the background image class, the object is classified into the background image class, no longer subordinate to the medium image class, and the sharpness value of the object is defined as the maximum sharpness Qb of the background image class. These realize further adjustment of object classification, so as for the object in the medium image class of the three classified image classes with the best sharpness.

a depth value estimation module 300, configured to estimate depth value of the object of each image class using a depth value estimation algorithm, based on the sharpness value of the classified object of each image class;

Specifically, after the operation of respectively acquiring an object of each image class to estimate sharpness value of the object of each image class, the depth value estimation module 300 estimates depth value of the object of each image class using a depth value estimation algorithm, based on the sharpness value of the classified object of each image class.

Wherein, the depth value estimation module 300 sets a reference sharpness Qs, and establishes a depth conversion function DP based on the reference sharpness Qs.

In the specific implementation, ways can be adopted as follows:

1, setting a reference sharpness Qs;

2, setting a depth conversion function DP(x), such as:

$$DP(i)=\beta(xi-Qs)/Qs$$

wherein, i is the object, xi is the sharpness value of object i, Qs is the reference sharpness, $\beta$ is a setting coefficient, and the absolute depth value corresponding to Qs is 0.

Wherein, after the operation of setting a reference sharpness Qs, and establishing a DP conversion function based on the reference sharpness Qs, the depth value estimation module 300 sets the reference sharpness Qs as the maximum sharpness Qm of the medium image class, estimates the depth value of the object of the foreground image class using the DP conversion function; sets the reference sharpness Qs as the maximum sharpness Qb of the background image class, estimates the depth value of the object of the medium image class using the DP conversion function; sets the reference sharpness Qs as the maximum sharpness Qb of the background image class, estimates the depth value of the object of the background image class using the DP conversion function.

In the specific implementation, ways can be adopted as follows:

1, estimating depth values of the objects in the foreground image class, setting the reference sharpness Qs as the maximum sharpness value Qm of the medium image class, respectively substituting q1$f$, q2$f$ . . . into the function DP(X) to obtain the depth value of each object q1, q2, . . . in the foreground image class:

$$DP(q1)=\beta(q1f-Qm)/Qm,$$

$$DP(q2)=\beta(q2f-Qm)/Qm,$$

. . . , wherein, each depth value is smaller than 0;

2, estimating depth values of the objects in the medium image class, setting the reference sharpness Qs as the maximum sharpness value Qb of the background image class, respectively substituting z1$f$, z2$f$ . . . into the function DP(X) to obtain the depth value of each object z1, z2, . . . in the medium image class:

$$DP(z1)=\beta(z1f-Qb)/Qb,$$

$$DP(z2)=\beta(z2f-Qb)/Qb,$$

. . . , wherein, each depth value is larger than 0.

3, estimating depth values of the objects in the background image class, setting the reference sharpness Qs as the maximum sharpness value Qb of the background image class, respectively substituting b1$f$, b2$f$ . . . into the function DP(X) to obtain the depth value of each object b1, b2, . . . in the background image class:

$DP(b1)=\beta(b1f-Qb)/Qb,$ $DP(b2)=\beta(b2f-Qb)/Qb,$

..., wherein, each depth value is smaller than or equal to 0.

a depth of field value estimation module 400, configured to estimate depth of field value of the object of each image class using a depth of field value estimation algorithm, based on the depth value of the object of each image class.

Specifically, after the operation of estimating depth value of the object of each image class using a depth value estimation algorithm, based on the sharpness value of the classified object of each image class, the depth of field value estimation module 400 estimates depth of field value of the object of each image class using a depth of field value estimation algorithm, based on the depth value of the object of each image class.

Wherein, the depth of field value estimation module 400 performs linear conversion on the depth value of the object in the medium image class using a linear function Line, to estimate the depth of field value of the object in the medium image class.

In the specific implementation, ways can be adopted as follows:
1, setting a linear function Line(y)=g*DP(y), wherein y is an item object, g is a setting proportional coefficient;
2, substituting the depth value $DP(z1), DP(z2), \ldots$ of each item object $z1, z2, \ldots$ in the medium image class into the Line function, to obtain the depth of field values of $z1, z2, \ldots$, respectively as $g\ DP(z1), g\ DP(z2), \ldots$.

Wherein, after the operation of performing linear conversion on the depth value of the object in the medium image class using a linear function Line, to estimate the depth of field value of the object in the medium image class, the depth of field value estimation module 400 performs nonlinear compression conversion on the depth value of the object in the background image class using a curve function Curve, to estimate the depth of field value of the object in the background image class.

In the specific implementation, ways can be adopted as follows:
1, setting a curve function Curve(w), w representing the depth value of an item object;
2, substituting the depth value $DP(b1), DP(b2), \ldots$ of each item object $b1, b2, \ldots$ in the background image class into the Curve function, to obtain the depth of field values of $b1, b2, \ldots$, respectively as Curve[DP(b1)], Curve[DP(b2)], ....

Wherein, after the operation of performing nonlinear compression conversion on the depth value of the object in the background image class using a curve function Curve, to estimate the depth of field value of the object in the background image class, the depth of field value estimation module 400 performs nonlinear compression conversion on the depth value of the object in the foreground image class using the curve function Curve, and superimposes the maximum value in the depth values of the objects of the medium image class, to estimate the depth of field value of the object in the foreground image class.

In the specific implementation, ways can be adopted as follows:
1, by using the above curve function Curve(w), substituting the depth value $DP(q1), DP(q2), \ldots$ of each item object $q1, q2, \ldots$ in the foreground image class into the H function, to obtain relative depth of field values of $z1, z2, \ldots$, respectively as Curve[DP(q1)], Curve[DP(q2)], ...;
2, superimposing the maximum depth of field value g DP(Qm) in the medium image class, Qm representing the maximum sharpness value in the medium image class, to obtain the depth of field value of each object $q1, q2, \ldots$ in the foreground image class, respectively as g DP(Qm)-Curve[DP(q1)], g DP(Qm)-Curve[DP(q2)], ....

Wherein, the above depth of field estimation of the object in the background image class and the foreground image class use the same curve function Curve, and can also use different curve functions Curve. The curve function Curve has the following characteristics:
1, the converted depth of field value and the depth value have the same positive and negative value, namely if the depth value of an object is negative, then the depth of field value of the object is negative, and if the depth value of an object is positive, then the depth of field value of the object is positive;
2, the smaller the depth value is, the smaller the depth of field value is, and the larger the depth value is, the larger the depth of field value is; for example, when the depth value is −50, Curve(−50)=−40, and when the depth value is −100, Curve(−100)=−60, Curve(−50)>Curve(−100);
3, the smaller the absolute depth value is, the smaller the compression ratio is, and the larger the absolute depth value is, the larger the compression ratio is; for example, when the depth value is −50, Curve(−50)=−40, the compression ratio is 0.2, and when the depth value is −100, Curve(−100)=−60, the compression ratio is 0.4.

From the above processes, the depth of field value of the object in the medium image class is under linear change as the depth value of the object changes, while the depth of field value of the object in the foreground image class and the background image class is under nonlinear compression change as the depth value changes, and the larger the absolute depth value is, the larger the compression ratio is.

In accordance with the above solution, the present disclosure provides a two-dimensional image depth of field generation method, which realizes generating depth of field from the two-dimensional image, so as to reduce image distortion and improve image stability, thereby satisfying the demand of users.

Further, in order to better realize depth of field generation from the two-dimensional image, the classification module 100 of this embodiment according to the present disclosure, is further configured to classify the target image into a foreground image class, a medium image class, and a background image class based on a positional relationship and a morphological relationship between items in the target image; respectively estimate the maximum sharpness value Qf, Qm and Qb corresponding to the foreground image class, the medium image class, and the background image class, based on gray scale information of the foreground image class, the medium image class, and the background image class.

Specifically, the classification module 100 according to a positional relationship and a morphological relationship between items in the target image, classifies the target image into the foreground image class, the medium image class and the background image class.

Wherein, the above target image may be a two-dimensional image. The classification module 100 according to a positional and relatively directional relationship of items in the two-dimensional image, such as distance, adjacency, overlap and so on, combined with shapes, gestures and shadow hints of items and so on, classifies the items into the foreground image class, the medium image class and the background image class.

Specifically, after the operation of classifying the target image into a foreground image class, a medium image class, and a background image class based on a positional relationship and a morphological relationship between items in the target image, the classification module 100 respectively estimates the maximum sharpness value Qf, Qm and Qb corresponding to the foreground image class, the medium image class, and the background image class, based on gray scale information of the foreground image class, the medium image class, and the background image class.

Wherein, the classification module 100 first converts the foreground image class, the medium image class and the background image class into the HSI format (H is chrominance information, S is color saturation information, and I is gray scale information); then processes the gray scale information I of the foreground image class, the medium image class and the background image class, to obtain alternating component I' of the gray scale information I, and according to the maximum frequency in the spectral characteristic of I', estimates the maximum sharpness values of the foreground image, the medium image, and the background image, respectively as Qf, Qm and Qb.

Wherein, in the specific implementation, the maximum sharpness estimation of the foreground image class is taken as an example:

1, each pixel of the foreground image is expressed by RGB, as {R(s, t), G(s, t), B(s, t)}, wherein, s and t respectively represent a row coordinate and a column coordinate; by converting the RGB to the HSI format, pixel gray scale information is expressed as: I(s,t)=[R(s,t)+G(s,t)+B(s,t)]/3;

2, an average gray scale value of the foreground image is expressed as:

$$\bar{I} = \frac{1}{S*T}\sum_{s=0}^{S-1}\sum_{t=0}^{T-1} I(s, t),$$

wherein, S and T represent the maximum coordinates of the foreground image pixels, and the alternating component of the pixel gray scale information I is expressed as: I'(s, t)=I(s,t)−$\bar{I}$;

3, I'(s, t) is converted to spatial frequency as:

$$U(g, l) = \sum_{s=0}^{S-1}\sum_{t=0}^{T-1} I'(s, t)e^{-j\times 2\pi\left(\frac{s\times g}{S}+\frac{t\times l}{T}\right)},$$

wherein, g is 0, 1, 2, . . . , S−1, l=0, 1, 2, . . . , T−1, the maximum value of |U(g,l)| is taken as the maximum sharpness value Qf of the foreground image class.

4, Similarly, the maximum sharpness Qm and Qb of the medium image class and the background image class can be estimated.

In accordance with the above solution, the present disclosure provides a two-dimensional image depth of field generation method, which realizes generating depth of field from the two-dimensional image, so as to reduce image distortion and improve image stability, thereby satisfying the demand of users.

Further, in order to better realize depth of field generation from the two-dimensional image, the sharpness estimation module 200 of this embodiment according to the present disclosure, is further configured to respectively detect boundaries and outlines of the items in the foreground image class, the medium image class, and the background image class, to obtain the objects corresponding to the foreground image class, the medium image class, and the background image class; respectively estimate the sharpness value of each object corresponding to the foreground image class, the medium image class, and the background image class, based on the objects corresponding to the foreground image class, the medium image class, and the background image class; and classify the objects corresponding to the foreground image class, the medium image class, and the background image class by comparing the sharpness values.

Specifically, after the operation of obtaining a target image, classifying the target image to obtain corresponding multiple image classes, and calculating the maximum sharpness value corresponding to each image class, the sharpness estimation module 200 respectively detects boundaries and outlines of the items in the foreground image class, the medium image class and the background image class, to obtain the objects corresponding to the foreground image class, the medium image class and the background image class.

Wherein, the sharpness estimation module 200 respectively detects boundaries and outlines of the items in the foreground image class, the medium image class and the background image class, and obtains the objects corresponding to the foreground image class, the medium image class and the background image class.

In the specific implementation, ways can be taken as follows:

1, by searching and detecting the boundary and outline of each item in the foreground image class, classifying and obtaining the object of each item in the foreground image class, labeled as q1, q2, . . . ;

2, by searching and detecting the boundary and outline of each item in the medium image class, classifying and obtaining the object of each item in the medium image class, labeled as z1, z2, . . . ;

3, by searching and detecting the boundary and outline of each item in the background image class, classifying and obtaining the object of each item in the background image class, labeled as b1, b2, . . . .

After the operation of respectively detecting boundaries and outlines of the items in the foreground image class, the medium image class and the background image class, to obtain the objects corresponding to the foreground image class, the medium image class and the background image class, the sharpness estimation module 200 respectively estimates the sharpness value of each object corresponding to the foreground image class, the medium image class, and the background image class, based on the objects corresponding to the foreground image class, the medium image class, and the background image class.

In the specific implementation, ways can be adopted as follows:

1, converting the object of each item q1, q2, . . . in the foreground image class into the HSI format, and similar with the above-mentioned maximum sharpness estimation method of the image classes, estimating the sharpness value of the object of each item, respectively as q1f, q2f, . . . ;

2, converting the object of each item z1, z2, . . . in the medium image class into the HSI format, and similar with the above-mentioned maximum sharpness estimation method of the image classes, estimating the sharpness value of the object of each item, respectively as z1f, z2f, . . . ;

3, converting the object of each item b1, b2, . . . in the background image class into the HSI format, and similar with the above-mentioned maximum sharpness estimation method of the image classes, estimating the sharpness value of the object of each item, respectively as b1f, b2f, . . . .

In accordance with the above solution, the present disclosure provides a two-dimensional image depth of field generation device, which better realizes generating depth of field from the two-dimensional image, so as to reduce image distortion and improve image stability, thereby satisfying the demand of users.

Further, in order to better realize depth of field generation from the two-dimensional image, the sharpness estimation module 200 of this embodiment according to the present disclosure, is further configured to compare the sharpness value of any one of the objects in the foreground image class with the maximum sharpness value Qm of the medium image class; classify the object into the medium image class, and define the sharpness value of the object as the maximum sharpness value Qm of the medium image class, if the sharpness value of any one of the objects in the foreground image class is larger than or equal to the maximum sharpness value Qm of the medium image class; compare the sharpness value of any one of the objects in the medium image class with the maximum sharpness value Qb of the background image class; classify the object into the background image class, and define the sharpness value of the object as the maximum sharpness Qb of the background image class, if the sharpness value of any one of the objects in the medium image class is less than or equal to the maximum sharpness value Qb of the background image class sharpness Qb.

Specifically, after the operation of based on the objects corresponding to the foreground image class, the medium image class and the background image class, respectively estimating the sharpness value of each object corresponding to the foreground image class, the medium image class and the background image class, the sharpness estimation module 200 compares the sharpness value of any one of the objects in the foreground image class with the maximum sharpness value Qm of the medium image class.

If the sharpness value of any one of the objects in the foreground image class is larger than or equal to the maximum sharpness value Qm of the medium image class, the object is classified into the medium image class, no longer subordinate to the foreground image class, and the sharpness value of the object is defined as the maximum sharpness value Qm of the medium image class.

After the operation of comparing the sharpness value of any one of the objects in the foreground image class with the maximum sharpness value Qm of the medium image class, the sharpness estimation module 200 compares the sharpness value of any one of the objects in the medium image class with the maximum sharpness value Qb of the background image class.

If the sharpness value of any one of the objects in the medium image class is larger than or equal to the maximum sharpness value Qb of the background image class, the object is classified into the background image class, no longer subordinate to the medium image class, and the sharpness value of the object is defined as the maximum sharpness Qb of the background image class. These realize further adjustment of objects classification, so as for the object in the medium image class of the three classified image classes with the best sharpness.

In accordance with the above solution, the present disclosure provides a two-dimensional image depth of field generation method, which better realizes generating depth of field from the two-dimensional image, so as to reduce image distortion and improve image stability, thereby satisfying the demand of users.

Further, in order to better realize depth of field generation from the two-dimensional image, the depth value estimation module 300 of this embodiment according to the present disclosure, is further configured to set a reference sharpness Qs, establish a depth conversion function based on the reference sharpness Qs; set the reference sharpness Qs as the maximum sharpness Qm of the medium image class, and estimate the depth value of the object of the foreground image class using the depth conversion function; set the reference sharpness Qs as the maximum sharpness Qb of the background image class, and estimate the depth value of the object of the medium image class using the depth conversion function; set the reference sharpness Qs as the maximum sharpness Qb of the background image class, and estimate the depth value of the object of the background image class using the depth conversion function.

Specifically, after the step of respectively estimating the sharpness value of each object corresponding to the foreground image class, the medium image class and the background image class based on the objects corresponding to the foreground image class, the medium image class and the background image class, the depth value estimation module 300 compares the sharpness value of any one of the objects in the foreground image class with the maximum sharpness value Qm of the medium image class Wherein, in the specific implementation, ways can be adopted as follows:

1, setting a reference sharpness Qs;

2, setting a depth conversion function DP(x), such as:

$$DP(i)=\beta(xi-Qs)/Qs$$

wherein, i is the object, xi is the sharpness value of object i, Qs is the reference sharpness, β is a setting coefficient, and the absolute depth value corresponding to Qs is 0.

After the operation of setting a reference sharpness Qs, and establishing a depth conversion function based on the reference sharpness Qs, the depth value estimation module 300 sets the reference sharpness Qs as the maximum sharpness Qm of the medium image class, estimates depth value of the object of the foreground image class using the DP conversion function.

Wherein, in the specific implementation, ways can be adopted as follows:

estimating depth values of the objects in the foreground image class, setting the reference sharpness Qs as the maximum sharpness value Qm of the medium image class, respectively substituting q1f, q2f . . . into the function DP(X) to obtain the depth value of each object q1, q2, . . . in the foreground image class:

$DP(q1)=\beta(q1f-Qm)/Qm,$ $DP(q2)=\beta(q2f-Qm)/Qm,$

. . . , wherein, each depth value is smaller than 0.

After the operation of setting a reference sharpness Qs, establishing a depth conversion function based on the reference sharpness Qs, the depth value estimation module 300 sets the reference sharpness Qs as the maximum sharpness Qb of the background image class, and estimates the depth value of the object of the medium image class using the DP conversion function.

Wherein, in the specific implementation, ways can be adopted as follows:
  estimating depth values of the objects in the medium image class, setting the reference sharpness Qs as the maximum sharpness value Qb of the background image class, respectively substituting z1f, z2f . . . into the function DP(X) to obtain the depth value of each object z1, z2, . . . in the medium image class:

$DP(z1)=\beta(z1f-Qb)/Qb,$ $DP(z2)=\beta(z2f-Qb)/Qb,$

. . . , wherein, each depth value is larger than 0.

After the operation of setting a reference sharpness Qs, establishing a DP conversion function based on the reference sharpness Qs, the depth value estimation module 300 sets the reference sharpness Qs as the maximum sharpness Qb of the background image class, and estimates the depth value of the object of the background image class using the DP conversion function.

Wherein, estimating depth values of the objects in the background image class, setting the reference sharpness Qs as the maximum sharpness value Qb of the background image class, respectively substituting b1f, b2f . . . into the function DP(X) to obtain the depth value of each object b1, b2, . . . in the background image class:

$DP(b1)=\beta(b1f-Qb)/Qb,$ $DP(b2)=\beta(b2f-Qb)/Qb,$

. . . , wherein, each depth value is smaller than or equal to 0.

In accordance with the above solution, the present disclosure provides a two-dimensional image depth of field generation method, which better realizes generating depth of field from the two-dimensional image, so as to reduce image distortion and improve image stability, thereby satisfying the demand of users.

Further, in order to better realize depth of field generation from the two-dimensional image, the depth of field value estimation module 400 of this embodiment according to the present disclosure, is further configured to perform linear conversion on the depth value of the object in the medium image class using a linear function Line, to estimate the depth of field value of the object in the medium image class; perform nonlinear compression conversion on the depth value of the object in the background image class using a curve function Curve, to estimate the depth of field value of the object in the background image class; perform nonlinear compression conversion on the depth value of the object in the foreground image class using the curve function Curve, and superimposing the maximum values of the depth values of the objects in the medium image class, to estimate the depth of field value of the object in the foreground image class.

Specifically, after the operation of estimating depth value of the object of each image class using a depth value estimation algorithm, based on the sharpness value of the classified object of each image class, the depth of field value estimation module 400 performs linear conversion on the depth value of the object of the medium image class using a linear function Line, to estimate depth of field value of the object of the medium image class.

Wherein, in the specific implementation, ways can be adopted as follows:
  1, setting a linear function Line(y)=g*DP(y), wherein y is an item object, g is a setting proportional coefficient;
  2, substituting the depth value DP(z1), DP(z2), . . . of each item object z1, z2, . . . in the medium image class into the Line function, to obtain the depth of field values of z1, z2, . . . , respectively as g DP(z1), g DP(z2), . . . .

After the operation of performing linear conversion on the depth value of the object of the medium image class using a linear function Line, to estimate the depth of field value of the object of the medium image class, the depth of field value estimation module 400 performs nonlinear compression conversion on the depth value of the object of the background image class using a curve function Curve, to estimate the depth of field value of the object of the background image class.

In the specific implementation, ways can be adopted as follows:
  1, setting a curve function Curve(w), w representing the depth value of an item object;
  2, substituting the depth value DP(b1), DP(b2), . . . of each item object b1, b2, . . . in the background image class into the Curve function, to obtain the depth of field values of b1, b2, . . . , respectively as Curve[DP(b1)], Curve[DP(b2)], . . . .

Specifically, after the operation of performing nonlinear compression conversion on the depth value of the object of the background image class using a curve function Curve, to estimate the depth of field value of the object of the background image class, the 3D television performs nonlinear compression conversion on the depth value of the object of the foreground image class using the curve function Curve, and superimposes the maximum value of the depth values the objects in the medium image class to estimate the depth of field value of the object in the foreground image class.

In the specific implementation, ways can be adopted as follows:
  1, by using the above curve function Curve(w), substituting the depth value DP(q1), DP(q2), . . . of each item object q1, q2, . . . in the foreground image class into the H function, to obtain relative depth of field values of z1, z2, . . . , respectively as Curve[DP(q1)], Curve[DP(q2)], . . . ;
  2, superimposing the maximum depth of field value g DP(Qm) in the medium image class, Qm representing the maximum sharpness value in the medium image class, to obtain the depth of field value of each object q1, q2, . . . in the foreground image class, respectively as g DP(Qm)-Curve[DP(q1)], g DP(Qm)-Curve [DP(q2)], . . . .

Wherein, the above depth of field estimation of the object in the background image class and the foreground image class use the same curve function Curve, and also can use different curve functions Curve. The curve function Curve has the following characteristics:

1, the converted depth of field value and the depth value have the same positive and negative value, namely if the depth value of an object is negative, then the depth of field value of the object is negative, and if the depth value of an object is positive, then the depth of field value of the object is positive;

2, the smaller the depth value is, the smaller the depth of field value is, and the larger the depth value is, the larger the depth of field value is; for example, when the depth value is −50, Curve(−50)=−40, and when the depth value is −100, Curve(−100)=−60, Curve(−50)>Curve(−100);

3, the smaller the absolute depth value is, the smaller the compression ratio is, and the larger the absolute depth value is, the larger the compression ratio is; for example, when the depth value is −50, Curve(−50)=−40, the compression ratio is 0.2, and when the depth value is −100, Curve(−100)=−60, the compression ratio is 0.4.

From the above processes, the depth of field value of the object in the medium image class is under linear change as the depth value of the object changes, while the depth of field value of the object in the foreground image class and the background image class is under nonlinear compression change as the depth value changes, and the larger the absolute depth value is, the larger the compression ratio is.

In accordance with the above solution, the present disclosure provides a two-dimensional image depth of field generation device, which better realizes generating depth of field from the two-dimensional image, so as to reduce image distortion and improve image stability, thereby satisfying the demand of users.

Figure 9:
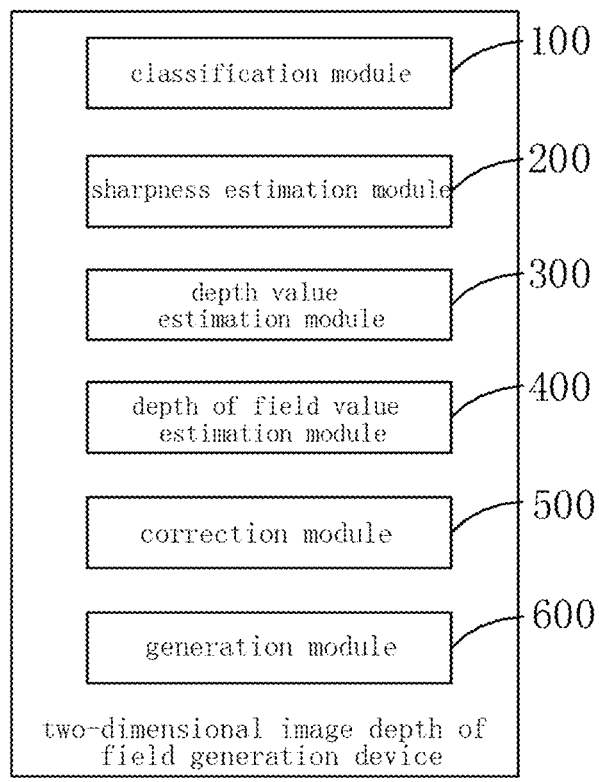
FIG. 9 is a functional diagram of a second embodiment of a two-dimensional image depth of field generation device according to this disclosure.

As illustrated in FIG. 9, the second embodiment according to the present disclosure provides a two-dimensional image depth of field generation device, based on the above device of the first embodiment, the device of this embodiment further including:

a correction module 500, configured to form a contrast image based on the depth of field value of the object in each image class, and correcting the depth of field value of the object in each image class according to the contrast image.

Specifically, after the operation of estimating depth of field value of the object of each image class using a depth of field value estimation algorithm, based on the depth value of the object of each image class, the correction module 500 sorts and superimposes the objects in the medium image class according to the depth of field values of the objects in the medium image class, to form the contrast image.

Wherein, in specific implementation, the object z1, z2, . . . in the medium image class may be sorted and superimposed according to the magnitude of the depth of field value g DP(z1), g DP(z2), . . . thereof, and the object with larger depth of field value is arranged on top of the object with smaller depth of field value, to form the contrast image.

After the operation of sorting and superimposing the objects in the medium image class based on the depth of field values of the objects in the medium image class, to form the contrast image, the correction module 500 compares spatial relationship of each object in the contrast image and the medium image class, to adjust the depth of field values of the objects in the medium image class.

Wherein, in specific implementation, the spatial relationship, such as occlusion, position and so on, of each object in the contrast image and the original medium image can be compared. For the object having abnormal spatial position relationship, taking the object with larger depth of field value as a reference, the depth of field value of the object with smaller depth of field value is adjusted symmetrically, the depth of field values of the objects in the medium image class are adjusted. For example, the depth of field value of the object z1 is 100, which is obtained by the above depth of field value estimation, the depth of field value of the object z2 is 80, in the new medium image, z1 is superimposed on top of z2, while in the original medium image z2 is on top of z1. Therefore, symmetrical depth of field adjustment is performed on z1 and z2: taking z1 as the reference, namely the depth of field value of z1 remains unchanged at 100, the depth of field value of z2 is adjusted to 80+2*(100−80), that is 120.

After the operation of comparing spatial relationship of each object in the contrast image and the medium image class, to adjust the depth of field values of the objects in the medium image class, the correction module 500 determines whether the depth of field values of the objects in the medium image class change.

If there is change in the depth of field values of the objects of the medium image class, it's to obtain the maximum change in the depth of field values of the objects in the medium image class, and superimpose the maximum change in the depth of field values of the objects in the medium image class on the depth of field values of the objects in the foreground image class. For example, the maximum depth of field value g DP(Qm) of the medium image class obtained by the above object depth of field value estimation is 500, after the above second step, the maximum depth of field value of the medium image class is adjusted to 550, namely the change is 50, then the depth of field values of all the objects in the foreground image class are increased by 50 to form new depth of field values.

If there is no change in the depth of field values of the objects in the medium image class, no adjustment is performed on the depth of field values of the objects in the foreground image class.

a generation module 600, configured to store the corrected depth of field value of the object in each image class, to generate corresponding image depth of field.

Specifically, after the operation of correcting the depth of field value of the object of each image class, the generation module 600 stores the corrected depth of field value of the object of each image class, to generated corresponding image depth of filed.

Wherein, the generation module 600 stores the corrected depth of field values of the objects in the foreground image class, the medium image class and the background image class, so as to form depth of field of the two-dimensional image. The depth of field can be stored in a local storage device for instant extraction.

In accordance with the above solution, the present disclosure provides a two-dimensional image depth of field generation device, which better realizes generating depth of field from the two-dimensional image, so as to reduce image distortion and improve image stability, thereby satisfying the demand of users.

The foregoing description merely portrays some illustrative embodiments in accordance with the disclosure and therefore is not intended to limit the patentable scope of the disclosure. Any equivalent structure or flow transformations that are made taking advantage of the specification and accompanying drawings of the disclosure and any direct or indirect applications thereof in other related technical fields shall all fall in the scope of protection of the disclosure.

What is claimed is:

1. A two-dimensional image depth of field generation method, comprising:

obtaining a target image, classifying the target image into a foreground image class, a middleground image class, and a background image class based on a positional relationship and a morphological relationship between items in the target image; respectively estimating maximum sharpness values Qf, Qm and Qb corresponding to the foreground image class, the middleground image class, and the background image class, based on gray scale information of the foreground image class, the middleground image class, and the background image class;

respectively acquiring an object of each image class to estimate a sharpness value of the object of each image class, and classifying the object of each image class based on a maximum sharpness values corresponding to each image class;

estimating a depth value of the object of each image class using a depth value estimation algorithm, based on the sharpness value of the classified object of each image class, wherein the depth value of the object of each image class comprises a depth value of the object of the foreground image class, a depth value of the object of the foreground image class, and a depth value of the object of the background image class; and performing linear conversion on the depth value of the object of the middleground image class by using a linear function Line, to estimate a depth of field value of the object of the middleground image class; performing nonlinear compression conversion on the depth value of the object of the background image class by using a curve function Curve, to estimate a depth of field value of the object of the background image class; and performing nonlinear compression conversion on the depth value of the object of the foreground image class by using the curve function Curve, and superimposing a maximum value of the depth value of the object of the middleground image class, to estimate a depth of field value of the object of the foreground image class.

2. The method of claim 1, wherein the operation of respectively acquiring an object of each image class to estimate sharpness value of the object of each image class, and classifying the object of each image class based on the maximum sharpness values corresponding to each image class, comprises:

respectively detecting boundaries and outlines of the items in the foreground image class, the middleground image class, and the background image class, to obtain the objects corresponding to the foreground image class, the middleground image class, and the background image class;

respectively estimating the sharpness value of each object corresponding to the foreground image class, the middleground image class, and the background image class, based on the objects corresponding to the foreground image class, the middleground image class, and the background image class; and classifying the objects corresponding to the foreground image class, the middleground image class, and the background image class by comparing the sharpness values.

3. The method of claim 2, wherein the operation of classifying the objects corresponding to the foreground image class, the middleground image class, and the background image class by comparing the sharpness values, comprises:

comparing the sharpness value of any one of the objects in the foreground image class with the maximum sharpness value Qm of the middleground image class;

classifying the object into the middleground image class, and defining the sharpness value of the object as the maximum sharpness value Qm of the middleground image class, if the sharpness value of any one of the objects in the foreground image class is larger than or equal to the maximum sharpness value Qm of the middleground image class.

4. The method of claim 2, wherein the operation of classifying the objects corresponding to the foreground image class, the middleground image class, and the background image class by comparing the sharpness values, comprises:

comparing the sharpness value of any one of the objects in the middleground image class with the maximum sharpness value Qb of the background image class; and classifying the object into the background image class, if the sharpness value of any one of the objects in the middleground image class is less than or equal to the maximum sharpness value Qb of the background image class sharpness Qb.

5. The method of claim 2, wherein the operation of estimating depth value of the object of each image class using a depth value estimation algorithm, based on the sharpness value of the classified object of each image class, comprises:

setting a reference sharpness Qs, establishing a depth conversion function based on the reference sharpness Qs;

setting the reference sharpness Qs as the maximum sharpness Qm of the middleground image class, and estimating the depth value of the object of the foreground image class using the depth conversion function;

setting the reference sharpness Qs as the maximum sharpness Qb of the background image class, and estimating the depth value of the object of the middleground image class using the depth conversion function; and setting the reference sharpness Qs as the maximum sharpness Qb of the background image class, and estimating the depth value of the object of the background image class using the depth conversion function.

6. The method of claim 1, wherein after the operation of estimating depth of field value of the object of each image class using a depth of field value estimation algorithm, based on the depth value of the object of each image class, further comprises:

forming a contrast image based on the depth of field value of the object in each image class, and correcting the depth of field value of the object in each image class according to the contrast image; and storing the corrected depth of field value of the object in each image class, to generate corresponding image depth of field.

7. A two-dimensional image depth of field generation device, comprising a processor and a non-transitory processor-readable middleground storing program code executable by the processor, the program code comprising:

a classification module, configured to obtain a target image, classify the target image into a foreground image class, a middleground image class, and a background image class based on a positional relationship and a morphological relationship between items in the target image; respectively estimate maximum sharpness values Qf, Qm and Qb corresponding to the foreground image class, the middleground image class, and the background image class, based on gray scale information of the foreground image class, the middleground image class, and the background image class;

a sharpness estimation module, configured to respectively acquire an object of each image class to estimate a sharpness value of the object of each image class, and classify the object of each image class based on the maximum sharpness values corresponding to each image class;

a depth value estimation module, configured to estimate a depth value of the object of each image class using a depth value estimation algorithm, based on the sharpness value of the classified object of each image class, wherein the depth value of the object of each image class comprises a depth value of the object of the foreground image class, a depth value of the object of the foreground image class, and a depth value of the object of the background image class; and a depth of field value estimation module, configured to perform linear conversion on the depth value of the object in the middleground image class by using a linear function Line, to estimate a depth of field value of the object of the middleground image class; perform nonlinear compression conversion on the depth value of the object in the background image class by using a curve function Curve, to estimate a depth of field value of the object of the background image class; and perform nonlinear compression conversion on the depth value of the object of the foreground image class by using the curve function Curve, and superimpose a maximum value of the depth value of the object of the middleground image class, to estimate a depth of field value of the object of the foreground image class.

8. The device of claim 7, wherein the sharpness estimation module is further configured to respectively detect boundaries and outlines of the items in the foreground image class, the middleground image class, and the background image class, to obtain the objects corresponding to the foreground image class, the middleground image class, and the background image class; respectively estimate the sharpness value of each object corresponding to the foreground middleground class, the middleground image class, and the background image class, based on the objects corresponding to the foreground image class, the middleground image class, and the background image class; and classify the objects corresponding to the foreground image class, the middleground image class, and the background image class by comparing the sharpness values.

9. The device of claim 8, wherein the sharpness estimation module is further configured to compare the sharpness value of any one of the objects in the foreground image class with the maximum sharpness value Qm of the middleground image class; classify the object into the middleground image class, and define the sharpness value of the object as the maximum sharpness value Qm of the middleground image class, if the sharpness value of any one of the objects in the foreground image class is larger than or equal to the maximum sharpness value Qm of the middleground image class.

10. The device of claim 8, wherein the sharpness estimation module is further configured to compare the sharpness value of any one of the objects in the middleground image class with the maximum sharpness value Qb of the background image class; classify the object into the background image class, if the sharpness value of any one of the objects in the middleground image class is less than or equal to the maximum sharpness value Qb of the background image class sharpness Qb.

11. The device of claim 8, wherein the depth value estimation module is further configured to set a reference sharpness Qs, establish a depth conversion function based on the reference sharpness Qs; set the reference sharpness Qs as the maximum sharpness Qm of the middleground image class, and estimate the depth value of the object of the foreground image class using the depth conversion function; set the reference sharpness Qs as the maximum sharpness Qb of the background image class, and estimate the depth value of the object of the middleground image class using the depth conversion function; set the reference sharpness Qs as the maximum sharpness Qb of the background image class, and estimate the depth value of the object of the background image class using the depth conversion function.

12. The device of claim 7, wherein the device further comprises:
    a correction module, configured to form a contrast image based on the depth of field value of the object in each image class, and correcting the depth of field value of the object in each image class according to the contrast image; and
    a generation module, configured to store the corrected depth of field value of the object in each image class, to generate corresponding image depth of field.

* * * * *